(12) United States Patent
Mok et al.

(10) Patent No.: US 7,418,429 B1
(45) Date of Patent: Aug. 26, 2008

(54) METHOD AND SYSTEM FOR FACILITATING A TRUSTED ON-LINE TRANSACTION BETWEEN INSURANCE BUSINESSES AND NETWORKED CONSUMERS

(75) Inventors: Kerry Mok, Singapore (SG); Kwek So Cheer, Singapore (SG); Ng Kuo Pin, Singapore (SG); Robert Chew, Singapore (SG)

(73) Assignee: Accenture Pte. Ltd., The Gateway East (SG)

( * ) Notice: Subject to any disclaimer, the term of this patent is extended or adjusted under 35 U.S.C. 154(b) by 379 days.

(21) Appl. No.: 09/693,437

(22) Filed: Oct. 20, 2000

(51) Int. Cl.
*G06Q 99/00* (2006.01)

(52) U.S. Cl. .......................... 705/67; 705/64
(58) Field of Classification Search .................. 705/50, 705/67, 64
See application file for complete search history.

(56) References Cited

U.S. PATENT DOCUMENTS

| | | | | |
|---|---|---|---|---|
| 5,903,721 A | * | 5/1999 | Sixtus | 713/201 |
| 5,903,873 A | * | 5/1999 | Peterson et al. | 705/4 |
| 5,909,873 A | * | 6/1999 | Littleton | 271/270 |
| 6,453,306 B1 | * | 9/2002 | Quelene | 705/80 |
| 2001/0049634 A1 | * | 12/2001 | Stewart | 705/26 |
| 2002/0111867 A1 | * | 8/2002 | Walker et al. | 705/14 |
| 2003/0032641 A1 | * | 2/2003 | Kinder et al. | 514/231.5 |
| 2003/0033205 A1 | * | 2/2003 | Nowers et al. | 705/26 |
| 2003/0149632 A1 | * | 8/2003 | Walker et al. | 705/23 |
| 2006/0080200 A1 | * | 4/2006 | Ashton et al. | 705/35 |

FOREIGN PATENT DOCUMENTS

JP 2001256344 * 9/2001

* cited by examiner

*Primary Examiner*—Pierre E. Elisca
(74) *Attorney, Agent, or Firm*—Hogan & Hartson LLP

(57) ABSTRACT

The present invention establishes a trusted market place which allows insurance goods and services to be transacted on the Internet between insurance business entities and certain type of consumers called "networked consumers" who can be properly authenticated without requiring each to obtain an authenticating device. The market players are the business entities, the networked entities, and the networked consumers. In this market structure, a plurality of business entities have access to the insurance market place, and they place details of insurance goods and/or services to be sold on-line. The networked insurance consumers can access the market place to purchase the insurance goods and services, and at least the registration must occur through a networked entity having an authenticating system. Because the authentication is performed via the networked entities, no authenticating system is required by the networked consumers.

30 Claims, 18 Drawing Sheets

PRE-NEGOTIATED GROUP BENEFITS PLAN DETAILS

345 — PLAN ID: 1234567XYZ

350 — INDUSTRY: TELECOMMUNICATIONS

355 — PROVIDER/ CONTACT INFO: XYZ TELECOMMUNICATION COMPANY, CONTACT PARTICULARS

360 — PLAN TITLE: PLAN X

365 — PRICE OF PLAN: $50/mo.

370 — DETAILED DESCRIPTION OF PLAN:
----------------------
----------------------
----------------------
----------------------

375 — MARKET VALUE OF PLAN: $70/mo.

NEGOTIATED GROUP BENEFITS PLAN DETAILS

905 — NETWORKED ENTITY IDENTIFIER: 45678LMO

910 — PLAN ID: 1234567XYZ

915 — INDUSTRY: TELECOMMUNICATIONS

920 — PROVIDER/ CONTACT INFO: XYZ TELECOMMUNICATION COMPANY, CONTACT PARTICULARS

925 — PLAN TITLE: PLAN X

930 — NEGOTIATED PRICE OF PLAN: $40/mo.

935 — DETAILED DESCRIPTION OF PLAN:

----------------------
----------------------
----------------------
----------------------

940 — MARKET VALUE OF PLAN: $70/mo.

● ENDORSE

PLAN CONFIGURATOR

400 — PLAN ID: 1234567XYZ

405 — INDUSTRY: TELECOMMUNICATIONS
410 — PROVIDER/ CONTACT INFO: XYZ TELECOMMUNICATION COMPANY, CONTACT PARTICULARS
415 — PLAN TITLE: PLAN X
420 — PRICE OF PLAN: $50/mo. — 425
430 — DETAILED DESCRIPTION OF PLAN:
------------------------
------------------------
------------------------
------------------------

435 — MARKET VALUE OF PLAN: $70/mo.
440 — NEGOTIATED PARTY'S IDENTIFIER: [           ] — 445

● SUBMIT
450

FIG. 13

```
                    ENDORSED GROUP BENEFITS PLAN DETAILS

495 ────────── NETWORKED ENTITY IDENTIFIER: 45678LMO
500 ──────────── PLAN ID: 1234567XYZ
505 ──────── INDUSTRY:        TELECOMMUNICATIONS
510 ─────── PROVIDER/         XYZ TELECOMMUNICATION COMPANY,
            CONTACT INFO:     CONTACT PARTICULARS
515 ──────── PLAN TITLE:      PLAN X
520 ─────── PRICE OF PLAN:    $40/mo.
525 ──────── DETAILED
             DESCRIPTION
             OF PLAN:
                              ------------------------
                              ------------------------
                              ------------------------
                              ------------------------
530 ──────── MARKET VALUE
             OF PLAN:         $70/mo.

● MORE INFO.        ● ACCEPT
                         535                540
```

FIG. 14

PRODUCT AND SERVICE DETAILS

INDUSTRY: TELECOMMUNICATIONS

550 — PRODUCT/SERVCE ID: 7654321JKL

555 — INDUSTRY: TELECOMMUNICATIONS

560 — PROVIDER/ CONTACT INFO: XYZ TELECOMMUNICATION COMPANY, CONTACT PARTICULARS

565 — PRODUCT/SERVICE: MOBILE PHONE MODEL Z

570 — PRICE OF PRODUCT/SERVICE: $100

575 — DETAILED DESCRIPTION OF PRODUCT/ SERVICE:

-------------------------
-------------------------
-------------------------
-------------------------

580 — MARKET VALUE OF PRODUCT/SERVICE: $120

● MORE INFO.   ● ADD TO SHOPPING CART 585          590

FIG. 15

METHOD AND SYSTEM FOR FACILITATING A TRUSTED ON-LINE TRANSACTION BETWEEN INSURANCE BUSINESSES AND NETWORKED CONSUMERS

FIELD OF THE INVENTION

The present invention relates generally to the field of on-line systems for facilitating a transaction via a trusted network, and in particular, to a method and system for facilitating a trusted transaction between business entities and networked consumers.

BACKGROUND OF THE INVENTION

With the advent of the Internet, virtually anything can be bought, sold, or negotiated on-line. Currently, many Web portals offer products and/or services to business entities and consumers. One serious problem facing many of these Web portals is in the area of security. Although some aspects of the security concerns have been resolved or at least reduced using various encryption or related technologies, many fraudulent transactions still occur because the current security measures are generally inadequate to address certain types of security breaches.

Currently, there are at least two major security issues in regard to on-line transactions. The first issue concerns confidentiality, that is, the ability to make a transaction without the transaction being known or intercepted by a third party. For instance, when a consumer purchases a product or service on the Internet using a credit card (i.e., submitting the credit card number and other requested information to the seller), it is imperative that the transaction be confidential such that sensitive information such as the credit card number, expiration date, and the identity of the product or service purchased, not be revealed to unauthorized parties. This aspect of on-line security has been dealt with, and to large extent, resolved, through the encryption technology where the sensitive information is encoded to prevent third parties from reading the data, even if the data were to be intercepted.

The second security issue concerns authentication, that is, the ability to uniquely identify the individual who is making the transaction. For instance, taking the example above where a consumer purchases a product or service on the Internet using a credit card, it is imperative that the seller be able to determine that the person submitting the credit card information is actually the owner of the credit card, or a person authorized by the owner. Failure to do so means that the transaction can be made void by the actual owner. The ability to identify the individual protects against at least two types of fraudulent transactions. One type is the case where an unauthorized person uses the credit card number of others to purchase a good or service on the Internet. The other type is the case where an authorized person uses the credit card, but who later denies having made the transaction. It is a commonly known fact that many credit card transactions result in a default due to a seller's inability to properly authenticate the identity of the individual making the transaction.

Currently, there are many authenticating devices and methods for uniquely identifying individuals which can presumably be used to prevent or limit the fraudulent transactions due to improper authentication. One such system is one employing digital certificate technology where a user obtains an encrypted file from a certificate authority who, before giving out the certificate in a special storage device such as a smart card, authenticates the user by requiring the user to produce an acceptable identification card. A special reader is then attached to the user's PC to read the digital certificate stored in the smart card. When a secure transaction needs to be made, the digital certificate is sent to the transacting party who then verifies the authenticity of the certificate and reads the information provided in the certificate such as the name of the person whom the certificate belongs to.

The fingerprint identification system, on the other hand, employs a fingerprint reading device which is attached to a user's PC. Whenever a secure transaction needs to be made, the user places a finger on the reader, and a digital image of the reader is sent to the transacting party. The image is then compared against a previously stored image in a database to identify the individual.

Although these devices may significantly reduce the on-line fraudulent transactions due to improper authentication, at this time, it is unrealistic to expect consumers to purchase such a device for the sole purpose of conducting a transaction over the Internet, especially, when alternative less-costly options such as offline purchases are available. In addition, because there are currently no single standard or device which is acceptable to all, purchasing such a device does not necessarily ensure that a trusted transaction would be possible.

For these reasons, many types of transactions which can presumably occur on-line are still being done only through the traditional off-line mediums, though conceivably such transactions may be facilitated on the Internet if a trusted method of transaction not requiring the consumers to purchase such authenticating devices were to be available. While many types of transactions would fall under this category, one notable example is the transactions concerning group benefits plans which cater to business entities and other entities such as educational institutions, clubs or associations which have a large base of individuals, e.g. employees, students, club members, etc., who are associated with the entity. These benefits can include services such as insurance coverage of all types, e.g., medical, dental, life, travel; loans with below-market rates; mobile phone service plans; etc. The benefits can also include goods which are sold to the associated individuals at a discounted rate.

A unique characteristic of the group benefits plans is that while the end product or service directly benefits the associated individuals, e.g., employees, club members, etc., the plans are negotiated by the entity whom the individuals are associated with. Take for instance, a company employing a large number of employees. A group benefits plan such as group insurance would be negotiated by the employer, i.e., the company, on behalf of the employees. By having control over a large pool of potential customers, the company is able to negotiate a better deal with the benefit provider than if the employees were to negotiate the benefit directly.

Currently, most aspects of procuring and administering of group benefits are manual in nature. Namely, the employer would have to manually choose and contact the group benefit provider and the group benefits plans are shown and negotiated off-line. Even after the plan is chosen, the details of the plan are generally presented to the employees in a manual manner. The shortcomings of such manual methods are many. First, because the company must manually select and contact each of group benefit providers and individually negotiate the plan, much time and resources are wasted, and thus, only a limited number of providers may be considered. And second, the administration of the benefits plan is inefficient because the employees must often communicate their choices and desires through the employer, even when a direct contact between the benefit provider and the employees would be more sensible and efficient.

While it can be appreciated that there is a need for system and method for facilitating a trusted transaction between business entities and consumers, and one which can be used to efficiently transact group benefits plans, currently, no such systems are known to exist, and certainly, none which are both efficient and trustworthy.

SUMMARY OF THE INVENTION

It is therefore an object of the present invention to overcome the shortcomings as described above.

The present invention establishes a trusted market place which allows goods and services to be transacted on the Internet between business entities and certain types of consumers called "networked consumers" who can be properly authenticated without requiring each to obtain an authenticating device or system. The market players are the business entities, the networked entities, and the networked consumers. In this market structure, a plurality of business entities have access to the market place, and they place details of goods and/or services to be sold on-line. The networked consumers can access the market place, but at least the registration must occur through the networked entities. Where the goods or services being offered by a business entity is a group benefits plan, the plan is first negotiated by the networked entity before it is made available to the network consumers. By accessing the market place, the networked consumers can purchase goods and services provided by the business entities, make choices about group benefits plans, and conduct other transactions. Because authentication is done via the networked entities, no authentication device is needed by the networked consumers.

The system for implementing the market structure comprises an administrator server which generally includes a server engine for performing various server functions; various databases for storing data relating to the business entities, networked entities, networked consumers, and the products and services being offered by the business entities; a plurality of Web pages which provide the necessary interfaces for facilitating the various transactions; and a security engine which performs various security functions including the function of authenticating the various parties accessing the server. The administrator's server is connected via the Internet to the business entities' PCs or servers which are coupled to an authenticating system. The servers of the networked entities are also connected via the Internet to the administrator server. The servers of the networked entities are also coupled to an authenticating system. Each of the networked entities has a secure intra-network system which links its server to its networked consumers' PCs.

A general methodology employed in facilitating a trusted sale of a product or service using the present system begins by having the business entity first registers with the administrator preferably by accessing the administrator's Web site and entering the requested information. Once the business entity is properly registered, the business entity submits the details of the products and/or services to be sold to the networked consumers so that they may be published on the administrator's Web site. The networked entity then registers itself with the administrator. Next, the networked consumer registers himself at the administrator's Web site. Once properly registered, the registered consumer accesses the administrator's Web site, and makes selections of the goods and services he or she wishes to purchase. Next, a payment for the good and/or services is made or arranged to be made. Finally, the business entity delivers the selected product or performs the service.

In the case where the product or service being offered is a group benefits plan, the group benefits provider (GBP) first develops a general group benefits plan. Multiple plans may be created to suit the needs of different customers. Next, the GBP registers with the administrator preferably by accessing the administrator's Web site and entering the requested information. Once the GBP is properly registered, the GBP submits the details of the plans it has developed so that they may be published on the administrator's Web site for viewing by the networked entities. The networked entities, to be able to access the Web page containing the details of the plans, must first register with administrator. After a successful registration, the networked entity accesses the administrator's Web site and obtains the details of the group benefits plans submitted by the GBP. Then the network entity (most likely through its human resource personnel) contacts the GBP and negotiates a group benefits plan which is customized for its networked consumers. When a consensus is reached, the customized group benefits plan is endorsed by the networked entity.

An embodiment of the present invention is a method facilitated by a computer network to accomplish a trusted transaction between a business entity and a networked consumer. The method provides an administrative server having a communications channel for electronically communicating with the business entity and having a communications channel for electronically communicating with a networked entity and the networked consumer. A business registration system is provided in the administrative server wherein the business entity can be authenticated and a unique identifier is assigned to the business entity (BEID), whereby the business entity is designated a registered business entity. The registered business entity is allowed to selectively access the administrative server to submit details of products and/or services provided by the registered business entity and to view selections made by the networked consumer wherein the administrative server will store the details of products and/or services provided by the registered business entity. A networked entity registration system is provided in the administrative server wherein the networked entity can be authenticated, whereby the networked entity is designated a registered networked entity. A networked consumer registration system is provided in the administrative server whereby a networked consumer who has authorized access to a registered networked entity's system can be designated a registered consumer and assigned a unique registered consumer identifier (RCID), and whereby a registered consumer with a valid RCID will be allowed access to data provided by a registered business entity and to make selections on the data, the selections being stored in the administrative server.

An another embodiment of the present invention is a method facilitated by a computer network to accomplish a trusted transaction of a group benefits plan involving a business entity, a networked entity, and a networked consumer. The method provides an administrative server having a communications channel for electronically communicating with the business entity and having a communications channel for electronically communicating with the networked entity and networked consumer. A business registration system is provided in the administrative server wherein the business entity can be authenticated and a unique identifier is assigned to the business entity (BEID), whereby the business entity is designated a registered business entity. The registered business entity is allowed to selectively access the administrative server to submit details of group benefits plans provided by the registered business entity and to view selections made by the networked consumer wherein the administrative server will store the details of the group benefits plans provided by the registered business entity. A networked entity registration system is provided in the administrative server wherein the networked entity can be authenticated and a unique identifier is assigned to the networked entity (NEID), whereby the networked entity is designated a registered networked entity. The registered networked entity is allowed to selectively access the details of the group benefits plans provided by a registered business entity and to endorse the group benefits plans wherein the administrative server will store the group benefits plans endorsed by the networked entity. A networked consumer registration system is provided in the administrative server whereby a networked consumer who has authorized access to a registered networked entity's system can be designated a registered consumer and assigned a unique registered consumer identifier (RCID), and whereby a registered consumer with a valid RCID will be allowed access to the endorsed group benefits plans and will be allowed to make selections on the endorsed group benefits plans.

In another embodiment of the present invention, an administrative server apparatus for facilitating a trusted transaction between a business entity and a networked consumer comprises a communication mechanism for allowing the administrative server to electronically communicate with the business entity and a communication mechanism for allowing the administrative server to electronically communicate with a networked entity and the networked consumer. A business registration mechanism is provided wherein the business entity can be authenticated and a unique identifier is assigned to the business entity (BEID), whereby the business entity is designated a registered business entity. Also provided is a mechanism provided for allowing the registered business entity to selectively access the administrative server to submit details of products and/or services provided by the registered business entity and to view selections made by the networked consumer, and a storage device for storing the details of products and/or services provided by the registered business entity. In addition a networked entity registration mechanism is provided wherein the networked entity can be authenticated, whereby the networked entity is designated a registered networked entity. Further provided is a networked consumer registration mechanism whereby a networked consumer having authorized access to a registered networked entity's system can be designated a registered consumer and assigned a unique registered consumer identifier (RCID), and whereby a registered consumer with a valid RCID will be allowed access to data provided by a registered business entity and make selections on the data, the selections being stored in the storage device of the administrative server apparatus.

In another embodiment of the present invention, the system under the control of a business entity facilitating a trusted transaction with a networked consumer comprises a business entity server. Also provided is an electronic communicating mechanism for providing the business entity server access to a server-to-server electronic communication channel. Further provided is an authenticating system coupled to said business entity server for facilitating an authentication process of the business entity when said networked entity server is accessing the electronic communication channel. Further provided is a mechanism for outputting registration information wherein the outputting of the registration information initiates the authentication process of the business entity, and for receiving a business entity identifier, wherein outputting the business entity identifier allows details of products and/or services to be outputted to the electronic communication channel and further allows selections of products and/or services made by the networked consumer to be received from the electronic communication channel.

In another embodiment of the present invention, a system under the control of a networked entity facilitating a trusted transaction between a business entity and a networked consumer, comprises a networked entity server. A system facilitates an electronic connection of the networked entity server to a PC via a network system. A communication mechanism is provided for providing networked entity server access to a server-to-server electronic communication channel. Also provided is an authenticating system coupled to the networked entity server for facilitating an authentication process of the networked entity when the networked entity server is accessing the electronic communication channel. Further provided is a mechanism for outputting networked entity registration information and for receiving a networked entity identifier, wherein the outputting of the networked entity registration information initiates the authentication process. Future provided is a mechanism for allowing the networked PC to access the electronic communication channel to output networked consumer registration information wherein the outputting of the networked consumer registration information initiates the authentication process of the networked entity, and for allowing the networked PC to receive a registered consumer identifier wherein an outputting of the registered consumer identifier allows the networked PC to receive details of products and/or services and to make selections on the products and/or services.

BRIEF DESCRIPTION OF THE DRAWINGS

FIG. 11 illustrates the interface for allowing the networked entity to view the pre-negotiated group benefits plan details.

FIG. 12 illustrates the interface for allowing the networked entity to view the negotiated group benefits plan details.

FIG. 13 illustrates the interface for allowing a group benefits provider to configure a group benefits plan for a particular networked entity based on the outcome of its negotiation with the networked entity.

FIG. 14 illustrates the interface for allowing the registered consumers to view the endorsed group benefits plan details.

FIG. 15 illustrates the interface for allowing the registered consumers to view the details of a product and/or service.

DETAILED DESCRIPTION OF THE INVENTION

Figure 1:
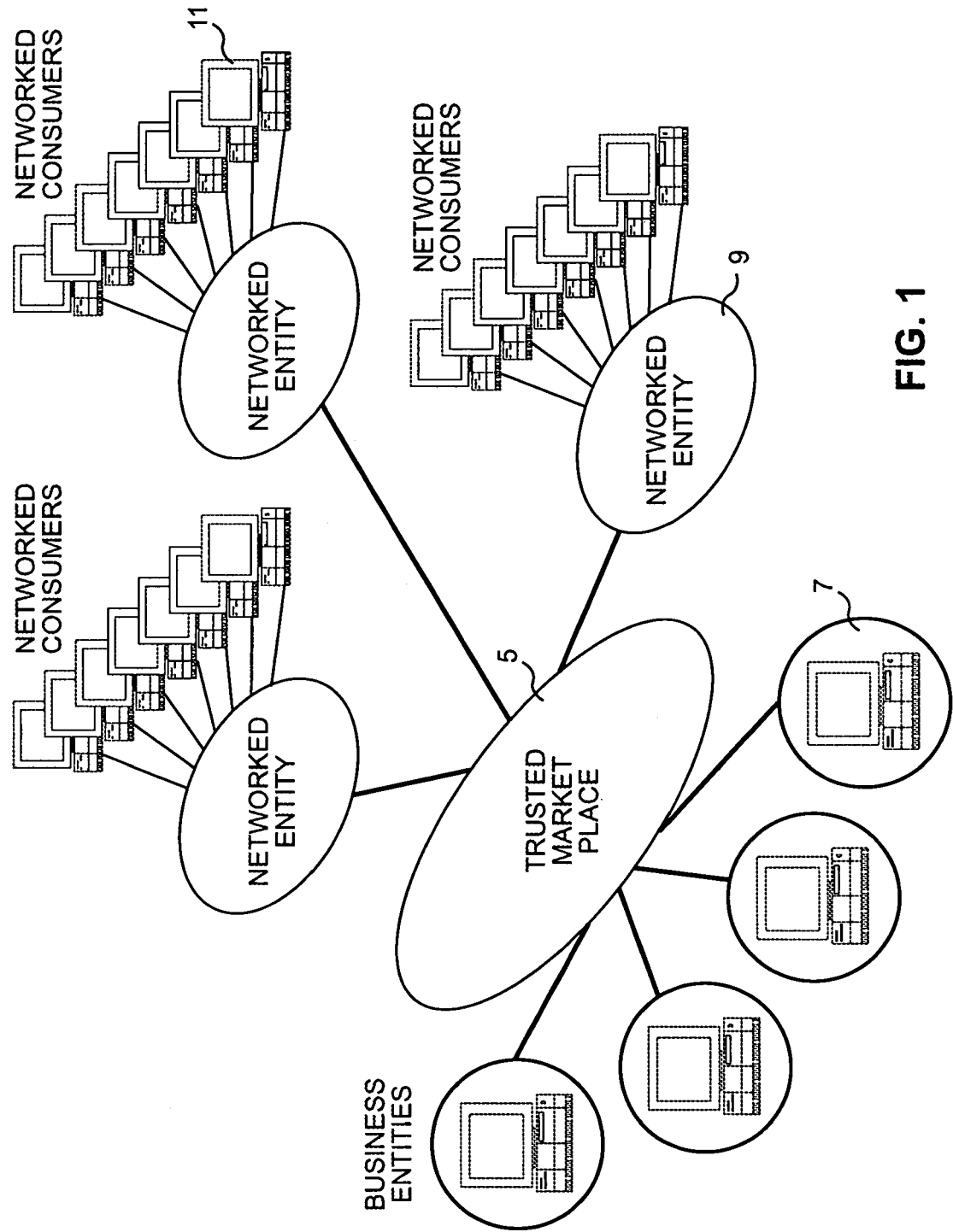
FIG. 1 is a symbolic diagram illustrating the relationships among the various parties using the trusted market place of the present invention.

As illustrated in FIG. 1, the present invention establishes a trusted market place 5 which allows goods and services to be transacted on the Internet between businesses and a certain type of consumers called the "networked consumers" who can be properly authenticated without requiring each to obtain an authenticating device. The market players are the business entities 7, the networked entities 9, and the networked consumers 11. In this market structure, a plurality of business entities 7 have access to the market place, and they place details of goods and/or services to be sold on-line. The networked consumers 11 can access the market place 5, but at least the registration must be made through the networked entities 9. Where the goods or services being offered by a business entity 7 is a group benefits plan, the plan is first negotiated by the networked entity 9 before it is made available to the network consumers 11. By accessing the market place 5, the networked consumers 11 can purchase goods and services provided by the business entities 7, make choices about group benefits plans, and conduct other transactions. Because authentication is done via the networked entities 9, no authentication device or system is needed by the networked consumers 11.

Although virtually any type of business can be part of the current system, frequent references will be made to the transaction of group benefits plans as a way of fully and clearly describing the present invention. However, it should be understood to those skilled in the art that other types of businesses may utilize the present system for transacting other types of goods and services. In general, the business entities can be providers of virtually any goods and/or services. For instance, they can be sellers of books, electronic products, gifts, etc. In the service industry, the business entities can be insurance companies, banks, telecommunications providers, etc.

The business entities which offer their goods or services as a group benefits plan will be called the group benefits providers (GBPs). A unique characteristic of a group benefits plan is that it is sold to and negotiated by the entity representing a group rather than the members of the group themselves. A common example of a traditional GBP would be insurance companies providing group coverage on life, health, and other types of insurance to employers having certain threshold number of employees. The group insurance is purchased and negotiated by the company, not its employees. The GBP, in the context of the present invention, can also be providers of other types of services such as telecommunication companies, Internet service providers, and banks. Moreover, the GBP can also be providers of products such as household items, foods, electronics goods, gifts, etc. Essentially, any business entities which can offer any service or product in exchange for an agreed form and quantity of consideration may be deemed a GBP.

The networked entities 9 can be any entity which has a group of associated individuals, called networked consumers 11, who are networked through a central, secure intra-network system. Alternatively, the networked consumers may be networked via the Internet provided certain authentication criteria are met. A common example of a networked entity would be a corporation employing a large number of employees who have access to a PC which is part of the company's secure intra-network system. Other examples are educational institutions, clubs, religious groups, or associations which provide access to their servers only to the members who are registered with their system.

Similar to the traditional group benefits plans sold off-line, the group benefits plans which are transacted using the present system directly benefit the networked consumers. However, the plans are negotiated by the networked entities on behalf of the networked consumers. The networked consumers, however, can make certain decisions about the group benefits plans by accessing the market place Web site through their PCs after they are properly registered the system.

Figure 2:
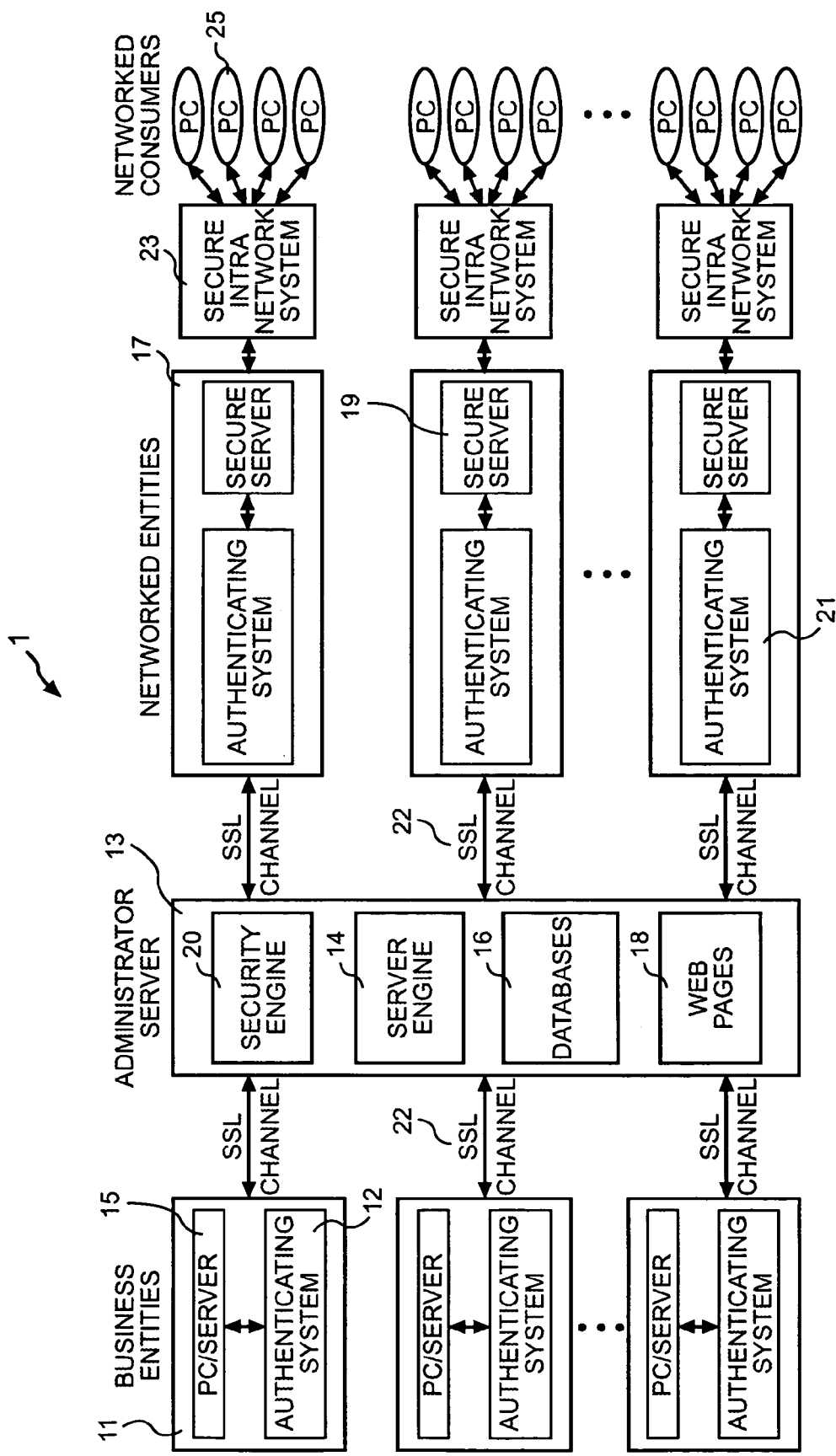
FIG. 2 is a block diagram illustrating the overall system for implementing the trusted market place shown in FIG. 1.

FIG. 2 illustrates the preferred system 1 for implementing the market structure shown in FIG. 1. As shown, the system 1 comprises the administrator server 13 which generally includes a server engine 14 for performing various server functions; various databases 16; a plurality of Web pages 18 which provide the necessary interfaces for facilitating the various transactions; and a security engine 20 which performs various security functions including the function of authenticating the various parties accessing the server 13. In the preferred embodiment, the security engine 20 utilizes a digital certificate authentication system where the authentication is performed by exchanging digital certificates with the transacting parties. The administrator's server 13 is connected via the Internet to the business entities' PCs or servers 15 which are coupled to an authenticating system 12. The servers 19 of the networked entities 17 are also connected via the Internet to the administrator server 13. The servers 19 of the networked entities 17 are also coupled to an authenticating system 21. Each of the networked entities 17 has a secure intra-network system 23 which links its server 19 to its networked consumers' PCs 25.

The databases 16 store data relating to the registration and other information relating to the business entities, networked entities, and networked consumers. They also store the details of products and services being offered by the business entities; the details of group benefits plans offered by the GBPs; various negotiated and endorsed versions of the group benefits plans; the various selections made by the business entities 11, networked entities 17, and networked consumers 25; payment details; and other details relating to the transactions as well as the administration of the transactions.

The intra-network system 23 may come in many forms. The most common is a local area network (LAN) which is a short distance network used to link a group of computers together within a building. An another type of an intra-network system is a wide area network (WAN) which is a network having a wider area coverage than the LAN. WAN can be used to interconnect a plurality of LANs. In the preferred embodiment of the present system, a LAN system is used where a password and an ID is required for access. The users of the LAN system should also have a unique e-mail account, and the e-mail address should have a domain name which matches that of the server 19.

Figure 3:
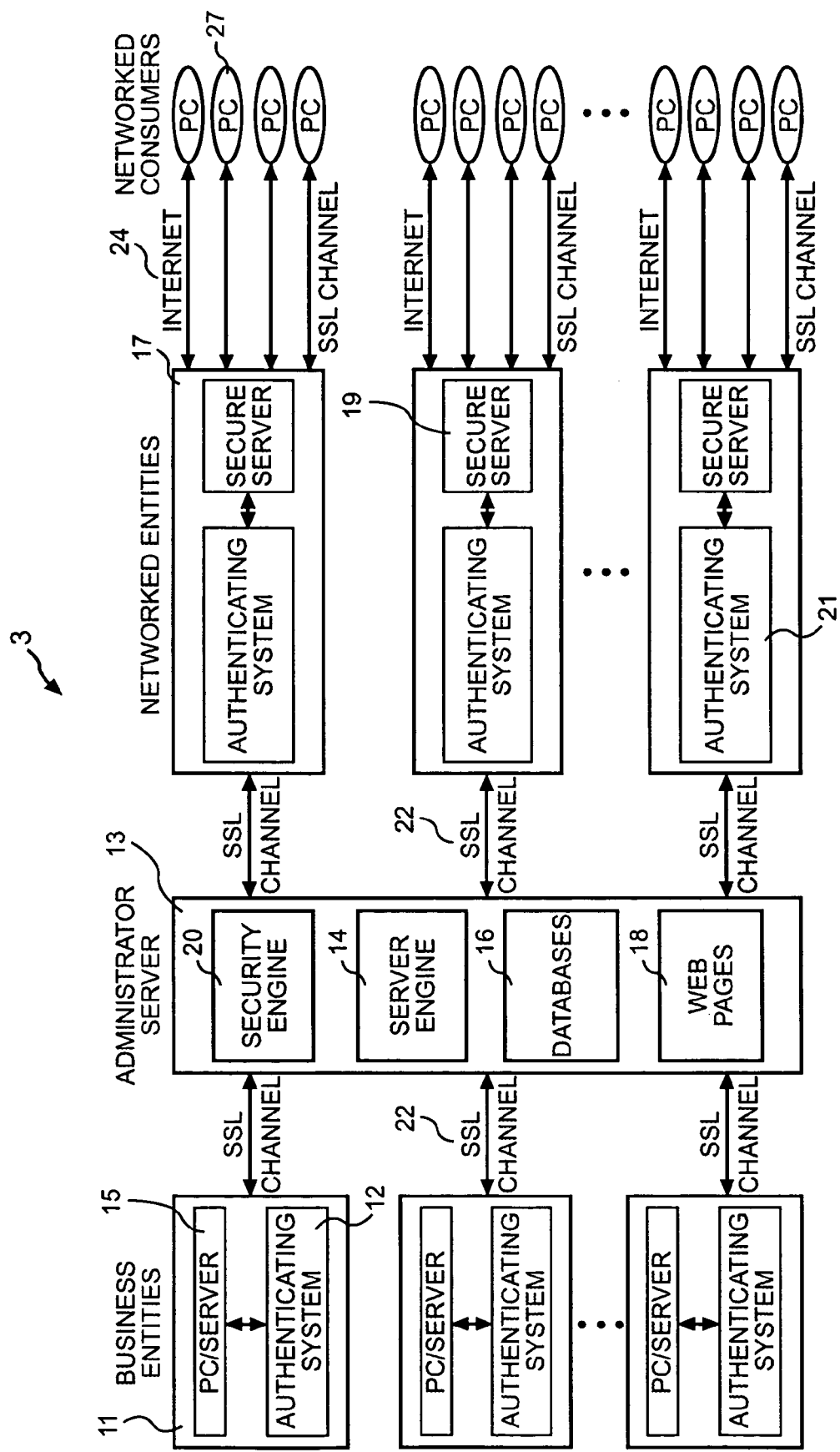
FIG. 3 is a block diagram illustrating another embodiment to the system shown in FIG. 1.

In another embodiment, as illustrated in FIG. 3, the intra-network system 23 is not required. In this embodiment, the networked consumers 27 associated with the networked entity 17 are networked through the Internet 24, preferably via a secure socket layer channel. Preferably, the networked entity 17 should require a networked consumer identifier such as a login ID and password for the networked consumers 27 to be able to access the server 19, and the login ID and the password should be provided to the networked consumers 27 in a secure manner. It is further preferred that the networked consumers 27 have a certain relationship with the networked entity which requires the networked consumer to be authenticated to the networked entity.

For example, a networked consumer who is networked via the Internet can be an account holder of a bank where the bank provides a Web portal (or a Web page) which is only accessible by account holders. In this situation, the account holders are bound to be well authenticated because banks typically require some authentication before an account can be opened. Moreover, if the bank were to have a Web portal which allows the account holder to make bank transactions through the Internet, unique identifiers are typically provided which may comprise particulars such as account number, account name, pin number (or password), etc. These particulars are typically provided to the account holder in a secure way such as in person or by mail.

Although in the embodiments shown in FIGS. 2 and 3 the business entities 11 utilize an authenticating system 12, in an another embodiment of the present invention, the business entities 11 are not required to have an authenticating system, or at least only an option is given to the business entities 11 to have such a system. In the embodiment where an authenticating system is not used, the authentication is performed offline by the operators of the administrative server 13. Various offline 10, authentication methods are possible, and are generally well known to those skilled in the art. For instance, the operator may call the business entities, research them through public records, or visit the business entities' sites. Other methods are clearly possible. Yet in another embodiment, no formal authentication is performed at all.

The confidentiality aspect of the security in the preferred embodiment of the present invention is addressed by deploying the well known and well utilized 2-way secure socket layer (SSL) channel 22 between the business entity PC or server 15 and the administrator's server 13. The 2-way SSL channel is also used in the communication between administrator's server 13 and the networked entities server 19. In the preferred embodiment, asymmetric 2-way 40-bit/128 bit encryption is used. Although the use of an SSL channel is preferred, it should be understood that it is possible to implement the present system without employing the SSL channel, or a channel employing other types of security technologies.

At least for certain types of transactions between the administrator 13 and the various parties, i.e., business entities, networked entities, and networked consumers, the authenticating systems 12 and 21 are used to authenticate the business entities and the networked entities, respectively. In the preferred embodiment, the authenticating systems 12 and 21 employ the digital certificate authentication protocol which is generally well known to those skilled in the art. Generally, the digital certificate authentication process entails each of the transacting parties obtaining a digital certificate (which is basically an encrypted file containing information about the owner of the certificate) from a certificate authority before any transaction is conducted. When a trusted transaction needs to be performed, the transacting parties electronically exchange the certificates, and after authenticating that the certificate is genuine, reads the contents of the certificate to verify the identify of the certificate owner.

Figure 5:
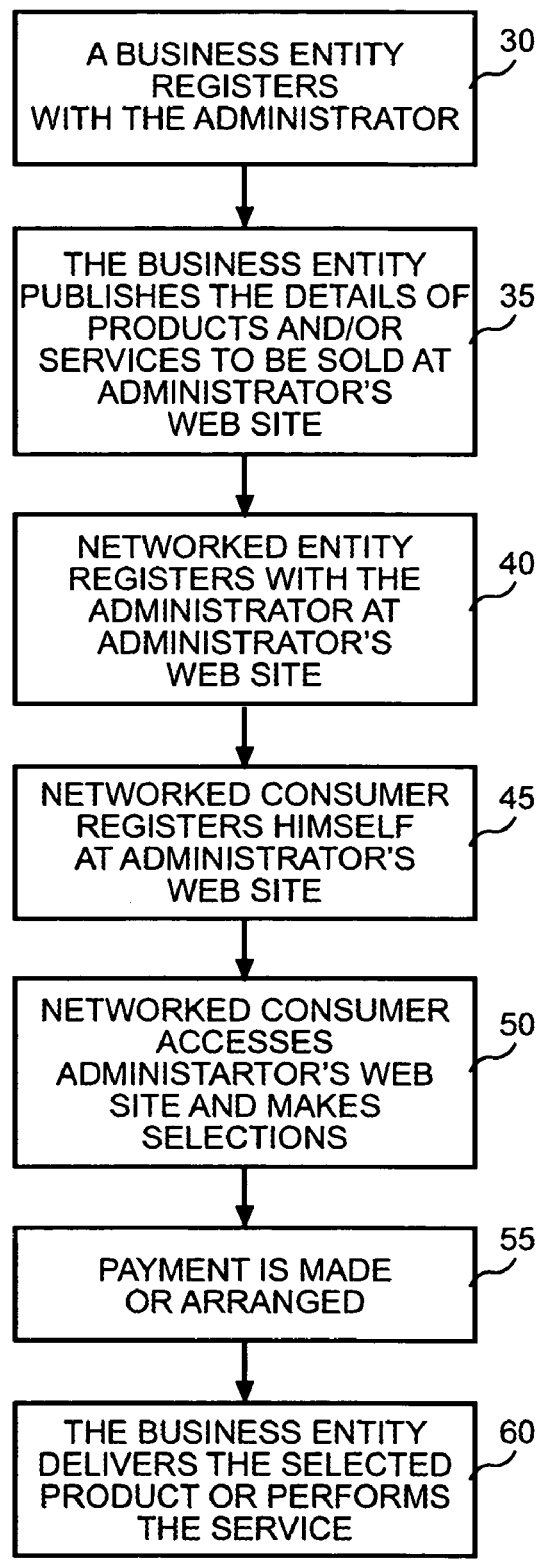
FIG. 5 illustrates the overview process flow for transacting a sale and purchase of goods and services using the system shown in FIG. 1 or 2.

A general overview of the methodology employed in facilitating a trusted sale of a product or service using the system 1 of FIG. 2 or system 3 of FIG. 3 is shown in FIG. 5. In step 30, the business entity first registers with the administrator preferably by accessing the administrator's Web site and entering the requested information. In step 35, once the business entity is properly registered, the business entity submits the details of the products and/or services to be sold to the networked consumers so that they may be published on the administrator's Web site. In step 40, the networked entity registers itself with the administrator. In step 45, the networked consumer registers himself at the administrator's Web site. Once properly registered, in step 50, the registered consumer accesses the administrator's Web site, and makes selections of the goods and services he or she wishes to purchase. In step 55, a payment for the good and/or services is made or arranged to be made. In step 60, the business entity delivers the selected product or performs the service.

Figure 6:
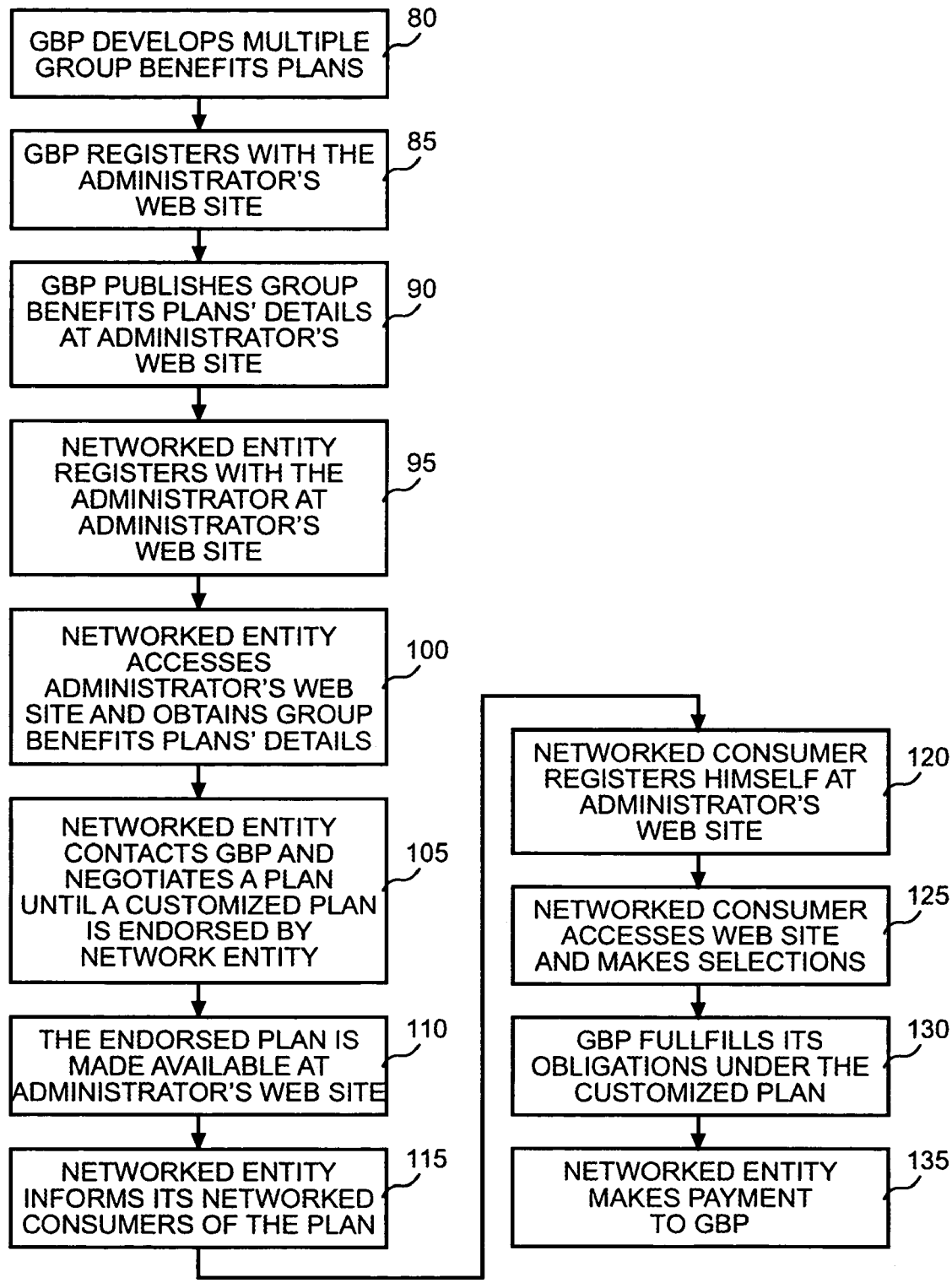
FIG. 6 illustrates the overview process flow for transacting a deal involving group benefits plan using the system shown in FIG. 1 or 2.

In the case where the product or service being offered is a group benefits plan, the general methodology is a little different, and is shown in FIG. 6. Referring to FIG. 6, in step 80, the group benefits provider (GBP) first develops a general group benefits plan. Multiple plans may be created to suit the needs of different customers. In step 85, the GBP registers with the administrator preferably by accessing the administrator's Web site and entering the requested information. In step 90, once the GBP is properly registered, the GBP submits the details of the plans it has developed so that they may be published on the administrator's Web site for viewing by the networked entities. The networked entities, to be able to access the Web page containing the details of the plans, must first register with the administrator which is performed in step 95. After a successful registration, in step 100, the networked entity accesses the administrator's Web site and obtains the details of the group benefits plans submitted by the GBP. In step 105, the networked entity (most likely through its human resource personnel) contacts the GBP and negotiates a group benefits plan which is customized for its networked consumers. When a consensus is reached, the customized group benefits plan is endorsed by the networked entity.

Still referring to FIG. 6, in step 110, the details of the endorsed group benefits plan are made available on the administrator's Web site. In step 115, the networked entity informs its networked consumers of the group benefits plan. Various methods may be employed for relaying the message to the employees, including e-mails, inter-office memorandums, brochures, telephone calls, etc. In step 120, the networked consumer registers himself at the administrator's Web site. Once properly registered, in step 125, the networked consumer accesses the administrator's Web site, and makes selections specific to the needs and wants of the individual networked consumer. In step 130, the GBP fulfills its obligations (whether they be performance of service or delivery of goods) made under the group benefits plan. In step 135, the networked entity makes a payment to the GBP.

To ensure that the networked entity's server 19 properly interfaces with administrator's server 13, some configuration of the networked entity's system may initially be needed by the personnel of the administrator 13. In the preferred embodiment, a custom Web page is provided in the networked entity's server 19 which its networked consumers 25, 27 must access before being re-routed to the administrator's server 13. This would ensure proper control of the access to the administrator's Web pages 18 by the networked consumers 25, 27 so that no unauthorized actions on behalf of the networked entity 17 is performed by the networked consumers 25, 27. The configuration may include providing special access for the PCs being used by the network entity's representative. This could be accomplished, for instance, by setting a cookie in the PCs and thus future access instances by the networked entity's representative are checked to have been done from the specified PCs. The setting and checking of the cookies, thus, tightens the security around the access by the networked entity's representative. Alternatively, or in conjunction with the setting of the cookies, a special access code may be provided to the network entity's representative to allow him/her to access the Web pages (whether located on the networked entity's server 19 or the administrator server 13) to perform the various administrative functions, e.g., registration of the networked entity, on behalf of the networked entity.

Figure 7:
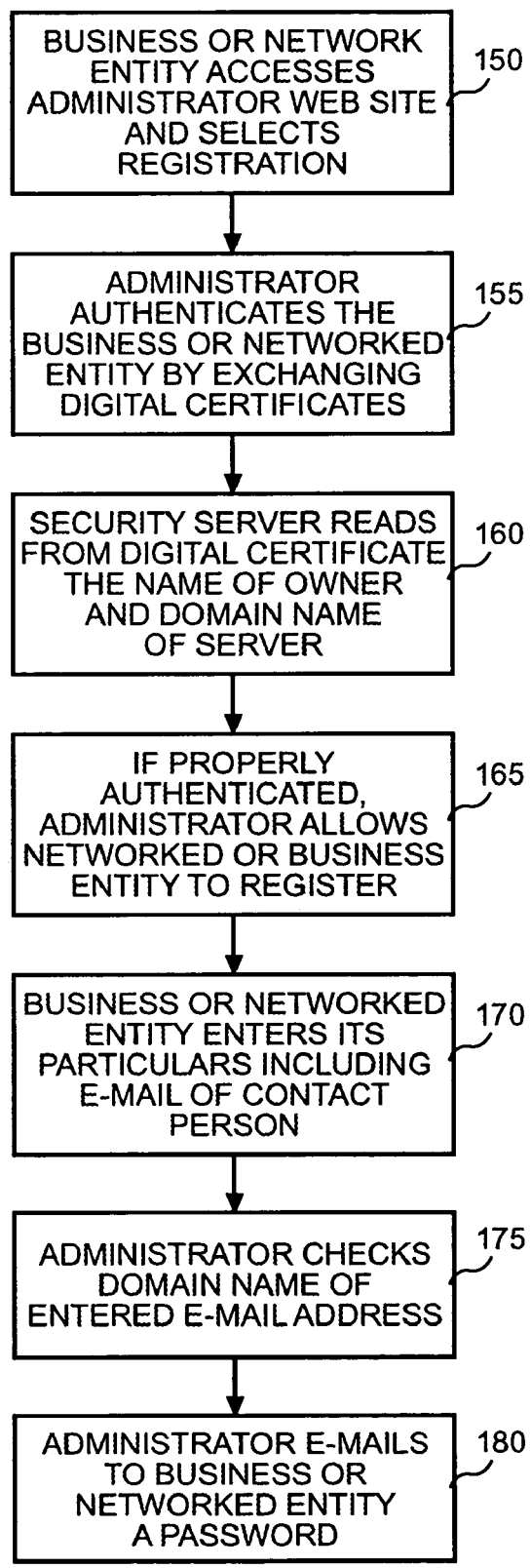
FIG. 7 illustrates the overview process flow for establishing a trusted communication channel between the administrator's server and a business entity or networked entity during registration.

The registration of the business entity 11 and the networked entity 17 in steps 85 and 95 of FIG. 6, respectively, is performed on a trusted communication channel. FIG. 7 illustrates the preferred methodology for registering the business entity and the networked entity on a trusted communication channel between the business entity PC or server 15 and the administrator's server 13, and between the networked entity's server 19 and the administrator's server 13. Referring to FIG. 7, in step 150, the business entity or networked entity accesses the administrator's Web site and selects 'Registration'. The security engine 20 of the administrator's server 13 authenticates the business entity or networked entity by exchanging the digital certificates via the authenticating devices 12 and 21. In step 160, when the digital certificate is received, the security engine 20 reads the name of the owner of the certificate, and if the digital certificate is sent by a server, then the domain name of the server. If the digital certificate is authenticated, the administrator server allows the business entity or networked entity to register in step 165. In step 170, the business entity or networked entity enters its particulars which includes the e-mail address of the contact person. The e-mail address serves as the login ID for the business entity or the networked entity. If applicable, a check is performed in step 175 to ensure that the domain name of the entered e-mail matches that found in the digital certificate, and that the e-mail address is still valid. In step 180, the administrator e-mails to the business entity or networked entity a password. All of the entered information is properly stored in the databases and classified under the respective parties.

Figure 8:
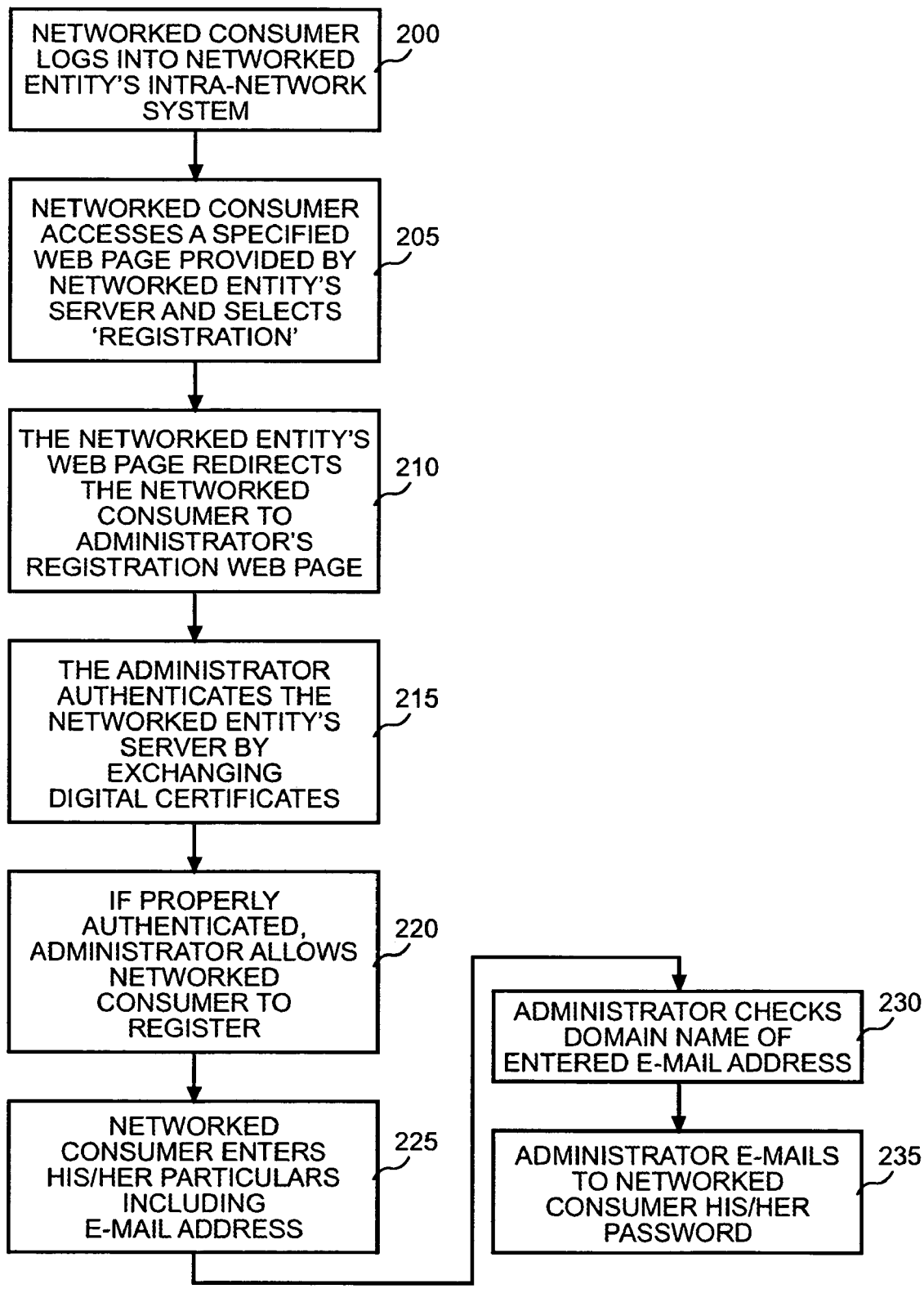
FIG. 8 illustrates the overview process flow for establishing a trusted communication channel between the administrator's server and a networked consumer during registration.

Because each business entity and networked entity has an authenticating system, e.g., digital certificate system, authenticating the business entity and the networked entity is a straightforward process. On the other hand, authenticating each of the networked consumers is not as straightforward because the networked consumers' PCs do not individually have an authenticating system. FIG. 8, therefore, illustrates the general methodology for establishing a trusted communication channel between the administrator server 13 and the networked consumers' PCs 25 during the registration of the networked consumer.

Referring to FIG. 8, in step 200, the networked consumer uses his networked PC to log into the networked entity's intra-network system or the Internet. In step 205, the networked consumer accesses a specified Web page provided by the networked entity's server, which in most cases, will be custom developed by the operating personnel of the administrator server, and selects 'Registration'. For those networked consumers using the Internet, an entry of proper login ID and/or password may be required. In step 210, the networked entity's Web page redirects the networked consumer to administrator's registration Web page. In step 215, the administrator authenticates the networked entity's server by exchanging the digital certificates and authenticating the one sent by the networked entity's server. The administrator also reads the name of the owner of the certificate and the domain name of the server which sent the certificate. In step 220, if the networked entity's server is properly authenticated, then the administrator allows the networked consumer to register. In step 225, the networked consumer enters his/her particulars including his/her e-mail address which will serve as his/her login ID. In step 230, if the networked consumer is part of an intra-network system, the administrator checks the entered e-mail address to ensure that the domain name matches that which was read from the digital certificate. The administrator checks to make certain that the e-mail is still valid using one of several commonly available techniques. In step 235, the administrator e-mails to the networked consumer his/her password. All of the entered information is properly stored in the databases. The registration process is now completed, and the registered networked consumer will be able to access the administrator's server using the login ID and password.

After the registration process, the networked consumers 25, 27 are presumed to be authenticated. In doing so, some reliance is placed on the networked consumers' ability to access the secure intra-network system 23, or in the case of networked consumers using the system 3, the networked consumers' ability to access the Web site of the networked entity using the login ID and password provided by the networked entity.

Figure 4:
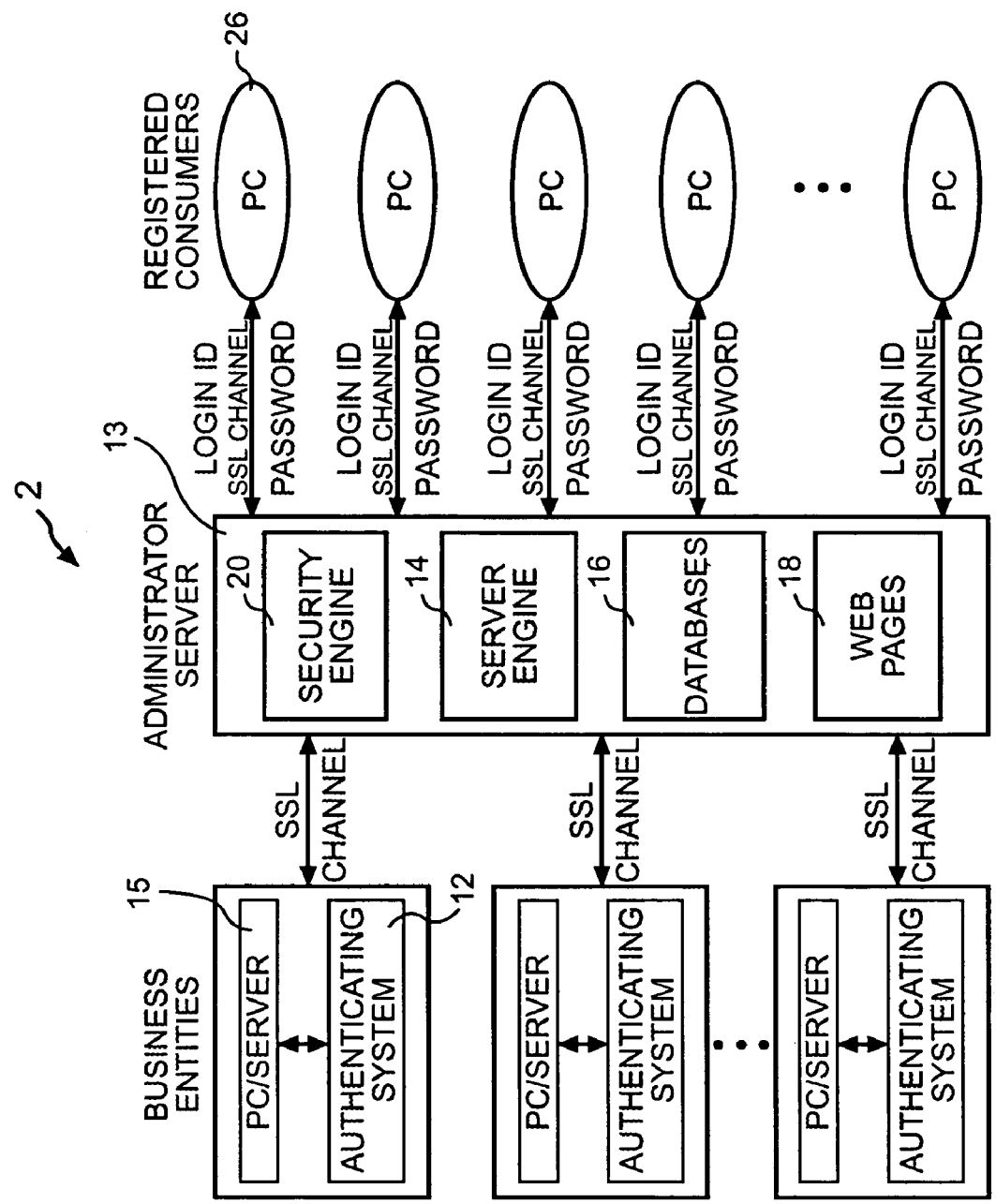
FIG. 4 is a block diagram illustrating the mechanism for allowing registered consumers to access the trusted market place of FIG. 1 without accessing through a networked entity.

Once the networked consumers have been properly registered with the administrator's system 13, the "registered consumers" need not go through the networked entity 17 to access the administrator's Web sites 18, though the access through this method is certainly still possible. FIG. 4 illustrates a system 2 which allows the registered consumers 26 to directly access the administrator's Web pages 18. As shown, the registered consumers' PCs 26 are now directly connected to the administrator's server 13 via the Internet preferably through an SSL channel. By providing the correct login ID and password which are assigned to the registered consumer 26, the registered consumers 26 are now able to access the administrator's Web pages 18 and make choices on purchases of goods and services and on group benefits plans.

It should be understood that the term "registered consumer" will generally refer to any networked consumer who is properly registered with the administrator 13, and not necessarily to those that are accessing the administrator's server 13 via the system 2 shown in FIG. 4, i.e., access without going through a networked entity. Registered consumers can equally access the administrator's server 13 via the system 1 shown in FIG. 2 or the system 3 shown in FIG. 3. Also, the term "networked consumer" generally refers to a consumer who is properly networked with a networked entity whether via the network shown in FIG. 2 or FIG. 3, and, unless otherwise stated or implied, does not necessarily define or imply anything about the consumer's registration status or network status.

The submission of the details of the products or services in step 35 of FIG. 5 or group benefits plans in step 90 of FIG. 6 is accomplished through an interface, a Web page, provided on the administrator's Web site. To access this Web page, the business entity accesses the home page of the administrator's Web site which asks the user to choose among three choices: 1) Goods and Services provider; 2) Networked Entity; and 3) Networked Consumer. The business entity would choose item 1). The business entity would then be required to enter its login ID and its password. The login ID would be the e-mail address of the contact person the business entity had entered during its registration. Multiple IDs corresponding to several contact persons may be allowed. The password is the one which was sent by the administrator to the contact person's e-mail address. The administrator matches the entered login ID and the password against its record in the databases 16, and if a proper match is found, then the administrator allows the business entity to access the next Web page 600 of FIGS. 1-6 which provides the business entity a choice of the following:

1. Submit Details of Products/Services
2. Submit Details of Group Benefits Plan
3. Configure the Group Benefits Plan
4. See the List of Submitted Products/Services or Group Benefits Plans
5. View the List of Selected Products/Services
6. View the List of Selected Group Benefits Plans Generally, choosing item 1, 605, allows the business entity to submit details about general products and/or services which are not part of a group benefits plan and which do not need to be negotiated with the networked entity before being made available to networked consumers. Choosing item 2, 610, allows the business entity to submit details about group benefits plans which do need to be negotiated with the networked entity. Choosing item 3, 615, allows the business entity to configure a plan to meet the terms as negotiated with the networked entity. Choosing item 4, 620, allows the business entity to see a list of submitted details for all products/services and group benefits plans. Choosing item 5, 625, allows the business entity to see a list of products/services which have been selected for purchase by the networked consumers. Choosing item 6, 630, allows the business entity to see a list of group benefits plans which have been negotiated and/or endorsed by the networked entity, and the endorsed group benefits plans which have been selected by the networked consumers.

Figure 9:
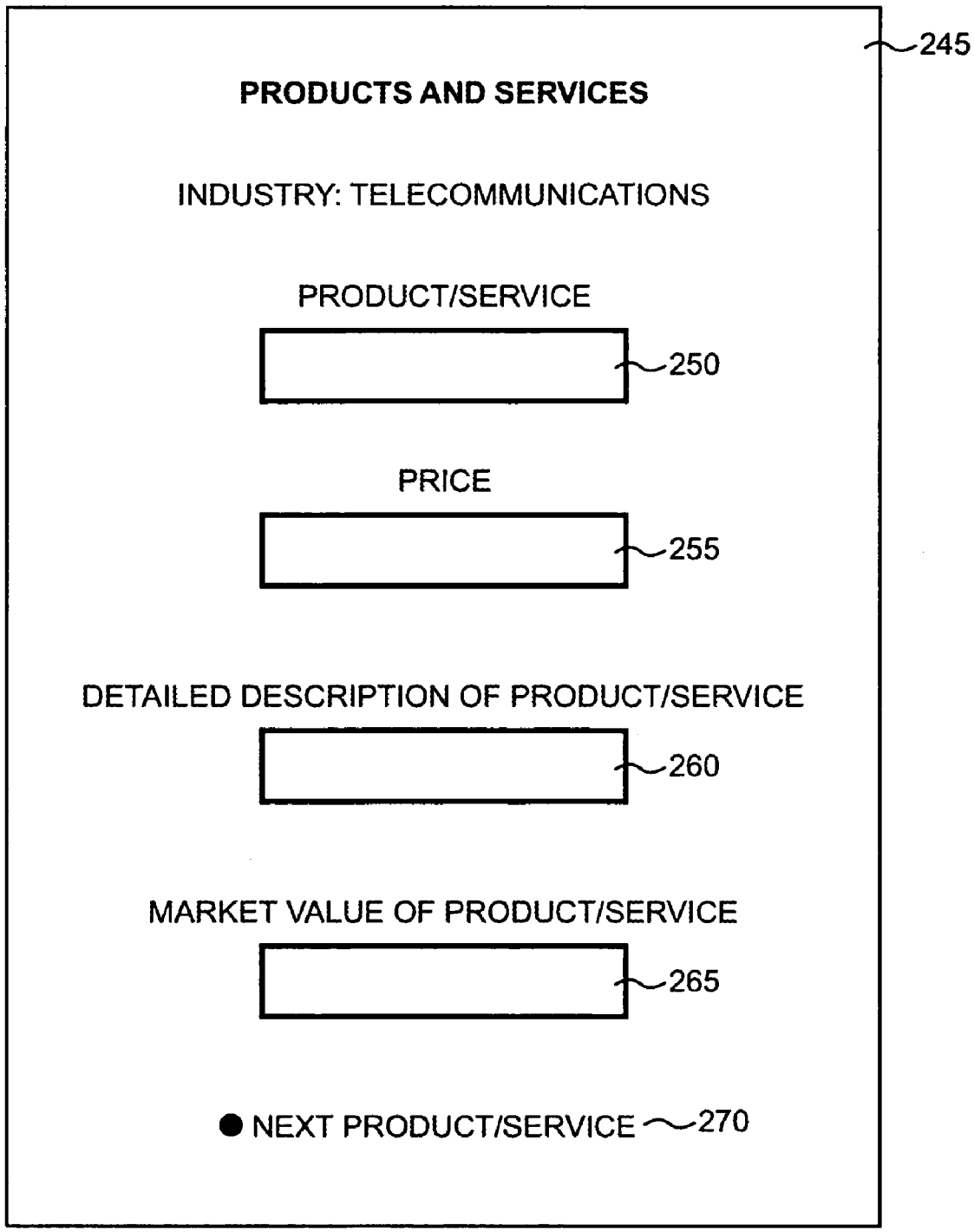
FIG. 9 illustrates the interface for allowing a business entity to submit details of its products and services to be offered using the present system.

When any of the above choices are selected, the business entity is shown a list of industries such as insurance, banking, telecommunications, etc. one of which the business entity selects. If item 1, 605, above is selected, then the business entity is shown the Web page 245 as illustrated in FIG. 9. Although, in this case, the telecommunication industry was chosen, the interfaces for the other industries are generally the same. The Web page 245 basically comprises a field for the product/service 250, price 255, detailed description of the product/service 260, and optionally, the market value of the product/service 265. The field 250 requires an input of the name of the product/service. The field 255 requires an input of the price the business entity is charging for the product/service. Presumably, the price may be discounted from the normal market price since the payment default rate will be lower due to the authentication feature provided by the present system. The field 260 requires an input of the detailed description of the product/service. The field 265, if provided, requires an input of the price of the product/service being offered in the market without a discount. The particulars of additional products/services may be entered by selecting the "Next" 270 option at the bottom of the Web page 245. All of the entered information is stored in the databases 16 and properly categorized under the respective business entities and industries. Moreover, each of the products/services is assigned a unique Product/Service Identifier (Product/Service ID) which is also stored in the databases 16.

Figure 10:
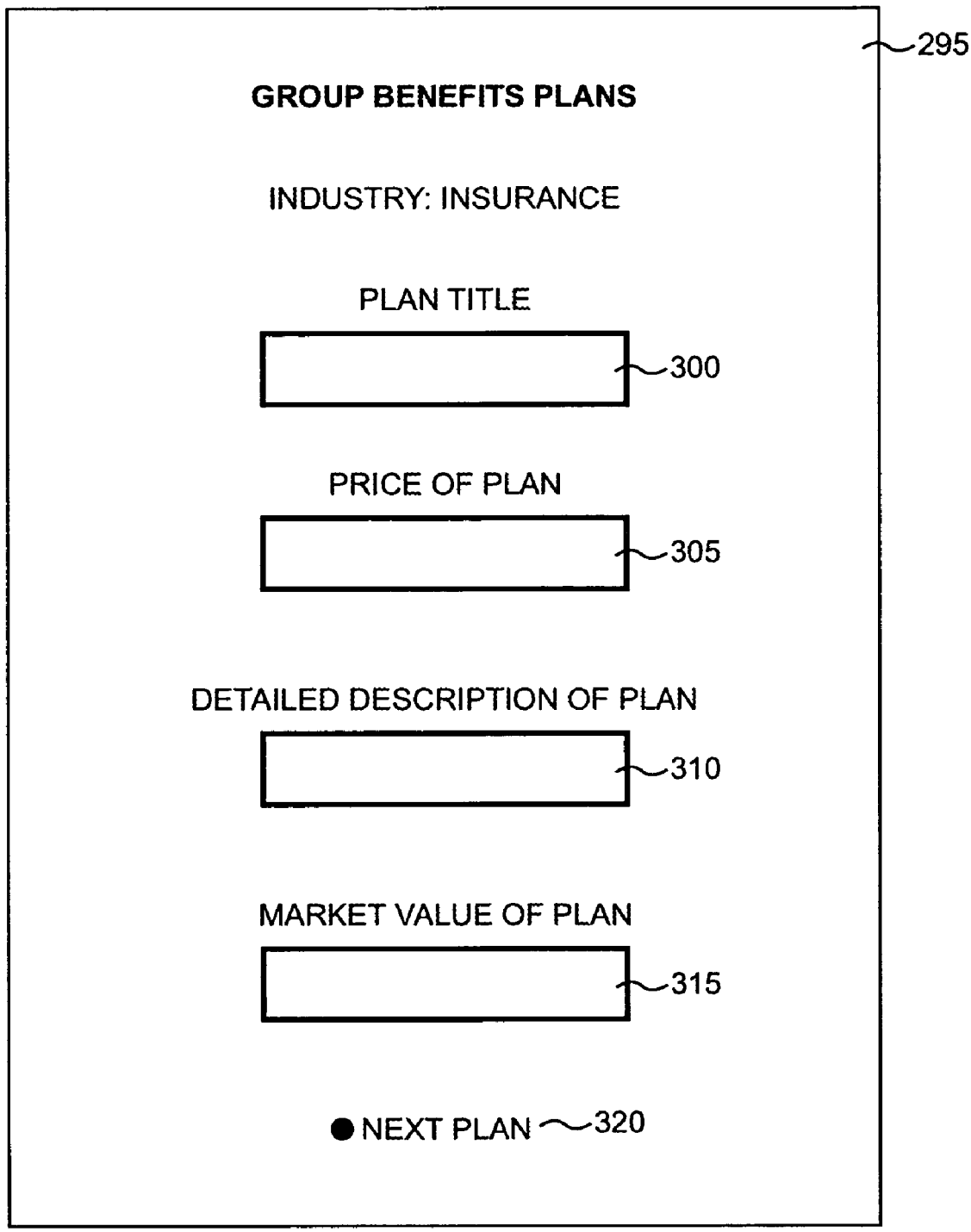
FIG. 10 illustrates the interface for allowing a group benefits provider to submit details of its group benefits plan to be offered using the present system.

FIG. 10 illustrates the Web page 295 that appears when item 2 above is selected by the business entity. Although, in this case, the insurance industry was chosen, the interfaces for the other industries are generally the same. The Web page 295 basically comprises a field for the title of the group benefits plan 300, price 305, detailed description of the plan 310, and optionally, the market value of the plan 315. The field 300 requires an input of the name of the group benefits plan. The field 305 requires an input of the price the business entity is charging for the group benefits plan. Presumably, the price may be discounted from the normal market price since the payment default rate will be lower due to the authentication provided by the present system. The field 310 requires an input of the detailed description of the plan. The field 315, if provided, requires an input of the price of the plan being offered in the market without a discount. The particulars of additional plans may be entered by selecting the "Next" 320 option at the bottom of the Web page. All of the entered information is stored in the databases 16 and properly categorized under the respective business entities and industries. Moreover, each of the plans is assigned a unique Plan Identifier (Plan ID) which is also stored in the databases 16.

In addition to the information described above, the Web page 295 of FIG. 10 may provide "advertisements" in an attempt to "cross-sell" or "up-sell" some of its other goods or services which may or may not be part of the plan. For instance, take a situation where the group benefits plan involves a basic mobile phone service where a monthly fee is charged. The basic service includes 120 minutes for "free" (i.e., no additional per-minute charges) but voice mail is not included. As a "cross-sell", the business entity may provide information about mobile phones, or other products related to a mobile phone subscription service. As an "up-sell", the business entity may provide information about a plan that includes unlimited minutes for free and a voice mail service. Alternatively, the Web page 295 may simply provide a hyperlink to another Web page which provides the information about cross-sell and up-sell products.

When the item 3, 615, above is selected, the business entity is shown a Web page 395 of FIG. 13 which allows the business entity operator to configure a group benefits plan to meet the specific needs and wants of a particular networked entity. The details of this plan configurator is shown and described further below.

When the item 4, 620, is selected, the business entity operator is shown a list of the submitted products/services and group benefits plans. By selecting an item on the list, the business entity is shown the details of the submitted information relating to the chosen product/service or group benefits plan. An option may be provided to allow the business entity to make changes to the listing or add additional products/services or plans.

For the items which were entered from the Web page 245 shown in FIG. 9, they are immediately provided for viewing and for purchase to the networked consumer because generally no negotiations are needed between the business entity operator and the networked entities. On the other hand, the group benefits plans which were entered from the Web page 295 shown in FIG. 10 must first be endorsed by a networked entity before they are available to the networked consumers. Therefore, the pre-negotiated versions of the plans are only available for viewing by the networked entities.

To access these pre-negotiated plans, the networked entity accesses the home page of the administrator's Web site which asks the user to choose among three choices: 1) Goods and Services provider; 2) Networked Entity; and 3) Networked Consumer. The networked entity would choose item 2). The business entity would then be required to enter its login ID and its password. The login ID would be the e-mail address of the contact person the networked entity had entered during its registration. The password is the one which was sent by the administrator to the contact person's e-mail address, though it may be changed later by the user. The administrator matches the entered login ID and the password against its records in the databases 16, and if a proper match is found, then the administrator allows the networked entity to access the next Web page 650 of FIG. 17 which provides the networked entity a choice of the following:

1. View the List of Products/Services
2. View the List of Pre-Negotiated Group Benefits Plans
3. View the List of Negotiated Group Benefits Plans
3. View the List Endorsed Group Benefits Plans When any of the above choices are selected, the networked entity is shown a list of industries such as insurance, banking, telecommunications, etc. one of which the networked entity selects. If item 1, 655, is selected, then the networked entity is shown a list of business entities which have submitted details of products/services under the industry chosen. This list is generally available to any networked entity registered with the system and is not specific to any one particular networked entity.

The list is also available to any registered networked consumers from any registered networked entity.

If item 2, 660, is selected, then the networked entity is shown a list of business entities which have submitted details of group benefits plans under the industry chosen which have not been negotiated or endorsed by the networked entity. This list is generally available to any networked entity registered with the system and is not specific to any one particular networked entity.

If item 3, 665, is selected, then the networked entity is shown a list of business entities that have submitted details of group benefits plans under the industry chosen which have been negotiated by the parties and configured by the business entity, but which have not been "endorsed" by the networked entity. This list is specific to the particular networked entity making the selection, and is not available to the other networked entities or any of the networked consumers.

If item 4, 670, is selected, then the networked entity is shown a list of business entities that have submitted details of group benefits plans under the industry chosen which have been "endorsed" by the networked entity. This list is specific to the particular networked entity making the selection, and is not available to the other networked entities, but is made available to the networked consumers belonging the networked entity that has endorsed the plans.

Assuming now that the networked entity has chosen item 2, 660, (View the List of Pre-Negotiated Group Benefits Plans), and chosen an industry, e.g. telecommunication, the networked entity is shown a list of group benefits providers (GBPs) that have provided details of group benefits plans. When a particular GBP is chosen off the list, the networked entity is shown a Web page 340 as illustrated in FIG. 11 (including some sample data for illustrative purposes only). The Web page provides in general the plan ID 345, here 1234567XYZ; the industry 350, here telecommunications; the name and contact information of the provider 355, here XYZ Telecommunication Company (no sample contact particulars); the title of the plan 360, here Plan X; the price of the plan 365, here $50/mo.; the detailed description of the plan 370 (no sample data provided); and the market value of the plan 375 (if provided by the provider) here $70/mo.

If the networked entity is interested in the plan, the networked entity (through its human resources manager or other representative) contacts the GBP and negotiates and customizes the plan to meet the needs and wants of the networked entity on behalf its networked consumers. Typically, the negotiated terms may involve price where further discount may be requested by the networked entity. If the details of the plan itself need to be modified, the GBP may have to create a new plan and submit it to the system.

Figure 16:
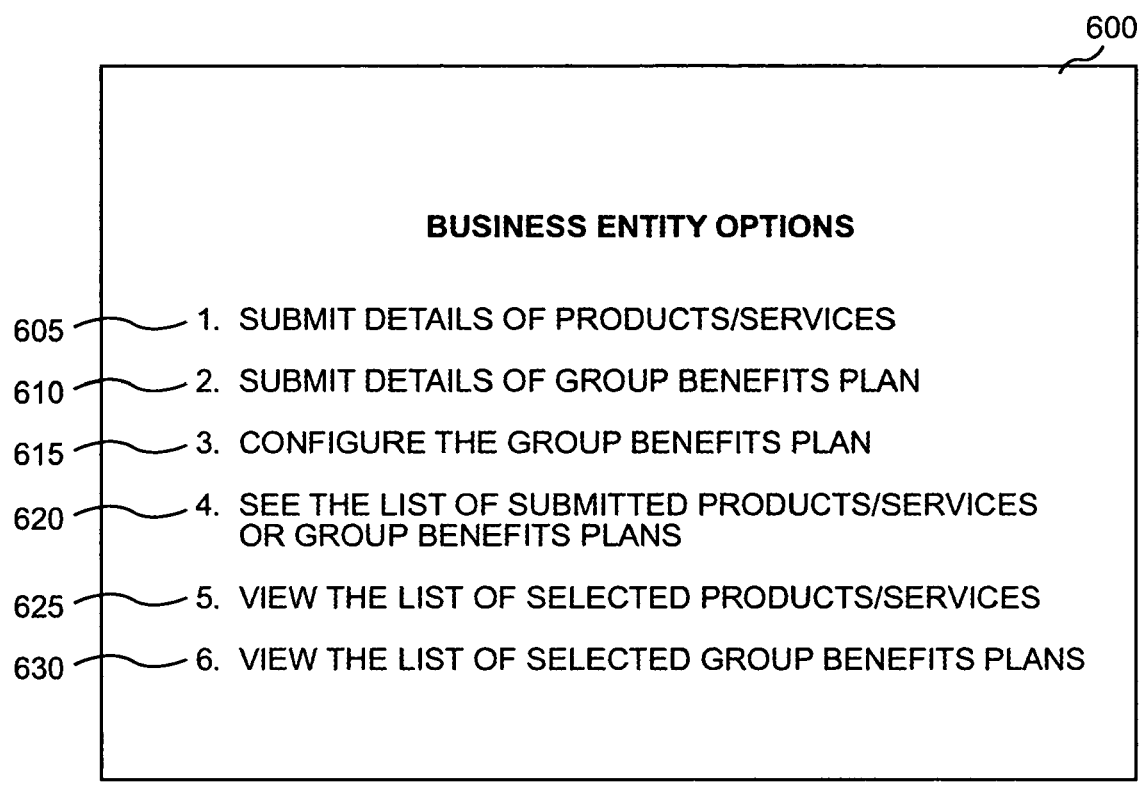
FIG. 16 illustrates the interface for allowing the business entity to choose among the several options as shown.

When the terms and conditions have been reached, the business entity accesses the Web page 600 of FIG. 16 and selects item 3, 615. The business entity is shown a list of the pre-negotiated group benefits plans it had submitted. The business entity selects the plan which had been the topic of the negotiation. When selected, a plan configurator interface is shown as illustrated in FIG. 13. The plan configurator page 395 includes the basic information relating to the plan in its pre-negotiated form including the plan ID 400, the industry 405, provider/contact info. 410, plan title 415, price of plan 420, detailed description of the plan, market value of the plan 435. The data for the heading Price of Plan 420 is provided within a modifiable field 425. Generally, most of the data provided is not modifiable except that which is provided in a field. The configurator, thus, allows the business entity to change the figure in the Price of Plan data field 425 to reflect the negotiated price.

The configurator further includes the heading Negotiated Party's ID 440 and a field 445 for entering the information. In this field 445, the business entity enters the identifier for the networked entity whom it had negotiated the plan with. Once all of the information has been entered and reviewed, the heading Submit 450 is chosen.

Figure 17:
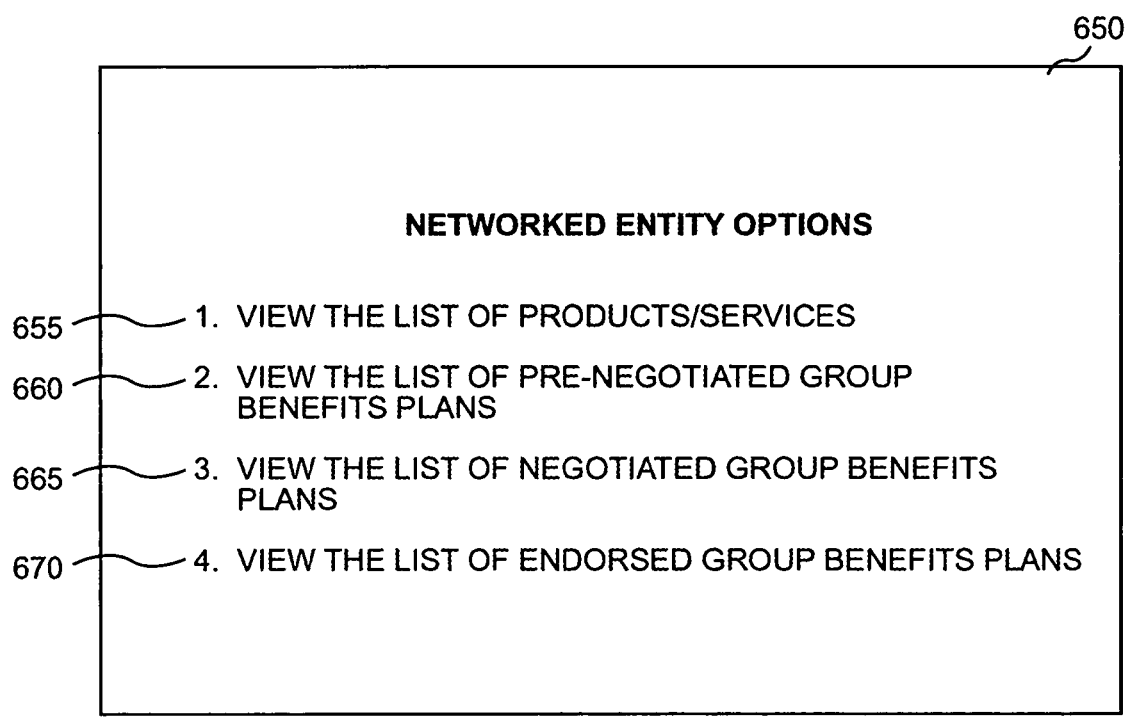
FIG. 17 illustrates the interface for allowing the networked entity to choose among the several options as shown.

When the information is submitted, it is deemed to have been negotiated (but not yet endorsed) which can now be viewed by the networked entity by choosing the option 3, 665, "View the list Negotiated Group Benefits Plans" of FIG. 17. This option allows the networked entity to view the list of all of the group benefits plans which have been negotiated by the networked entity. Note that several GBPs may have submitted negotiated plans which are available for the networked entity's choosing. Once the networked entity has had an opportunity to review all of the negotiated plans, it can endorse the plan or plans which best meet its requirements. Because this list is specific to each networked entity, it is only available for viewing for the networked entity having the identifier which matches the one entered by the business entity in FIG. 13 when the authentication process is performed.

When the networked entity is ready to endorse a plan or plans, it selects option 3, 665, "View the list Negotiated Group Benefits Plans" of FIG. 14, and selects one of the plans shown on the list. The networked entity is then shown the Web page 900 of FIG. 12 (including some sample data for illustrative purposes only). The Web page 900 provides in general the networked entity identifier 905, here 45678LMO; plan ID 910, here 1234567XYZ; the industry 915, here telecommunications; the name and contact information of the provider 920, here XYZ Telecommunication Company (no sample contact particulars); the title of the plan 925, here Plan X; the negotiated price of the plan 930, here $40/mo.; the detailed description of the plan 935 (no sample data provided); and the market value of the plan 940 (if provided by the provider) here $70/mo. Additionally, the Web page 900 is provided with the heading "Endorse" 945 which, when selected, converts the negotiated plan into an endorsed plan.

After a group benefits plan has been endorsed by the networked entity, the registered consumers 26 are able to make decisions on the plan. To access the Web page showing the endorsed plan, the registered consumer accesses the home page of the administrator's Web site which asks the user to choose among three choices: 1) Goods and Service provider; 2) Networked Entity; and 3) Consumer. The registered consumer would choose item 3). The registered consumer 26 would then be required to enter its login ID and its password. The login ID would be the e-mail address the registered consumer had entered during its registration. The password is the one which was sent by the administrator to the registered consumer's e-mail address, though an option may be provided to later change the password. The administrator matches the entered login ID and the password against its record in the databases 16, and if a proper match is found, then the administrator allows the registered consumer to access the next Web page 700 of FIG. 18 which provides the business entity a choice of the following:

1. View the List of Products and Services
2. View the List of Endorsed Group Benefits Plans When either of the above choices is selected, the registered consumer is shown a list of industries such as insurance, banking, telecommunications, etc. one of which the registered consumer selects. If item 1, 705, is selected, then the registered consumer is shown a list of business entities which have submitted details of products/services under the industry chosen. This list is generally available to any registered networked entity 17 and registered consumers and is not specific to any one particular party.

If item 2, 710, is selected, then the registered consumer is shown a list of group benefits plans under the industry chosen which have been endorsed by the networked entity. This list is specific to the particular networked entity which the registered consumer is a member of, and is not available to the registered consumers that belong to other networked entities.

Assuming now that the registered consumer has chosen item 2, 710, (View the List of Endorsed Group Benefits Plans), and chosen an industry, e.g. telecommunication, the networked entity is shown a list of group benefits providers (GBPs) that have provided details of group benefits plans. When a particular GBP is chosen off the list, the networked entity is shown a Web page 490 as illustrated in FIG. 14 (including some sample data for illustrative purposes only). This page can also be viewed by the networked entity by choosing item 4, 670, on the Web page 650 of FIG. 17. The Web page 490 provides in general the networked entity identifier 495, here 45678LMO; plan ID 500, here 1234567XYZ; industry 505, here telecommunications; the name and contact information of the provider 510, here XYZ Telecommunication Company (no sample contact particulars); the title of the plan 515, here Plan X; the price of the plan 520, here $40/mo.; the detailed description of the plan 525 (no sample data provided); and the market value of the plan 530 (if provided by the provider) here $70/mo. Additional information may be obtained by selecting the "More Information" 535 option which may be hyperlinked to the business entity's own Web page. If the registered consumer wishes to sign onto the plan, the "Accept" 540 option is chosen. For each registered consumer who chooses to sign onto a group benefits plan, the details of the transaction including the identity of the consumer, the plan ID, date, etc. are stored in the databases 16 and properly catalogued for retrieval.

Figure 18:
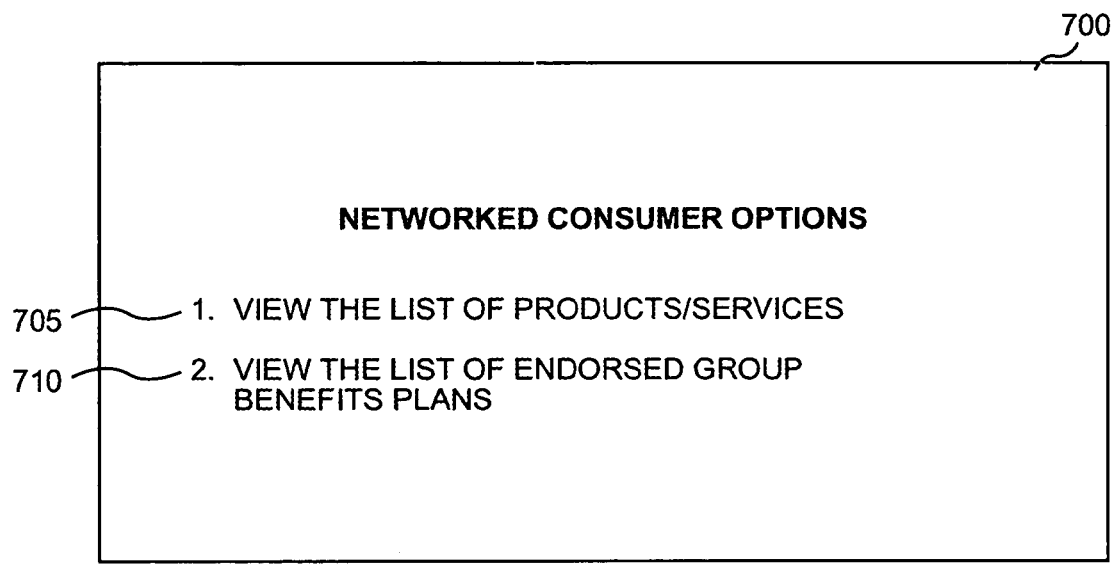
FIG. 18 illustrates the interface for allowing the networked consumer to choose between the two options as shown.

If on the other hand, the registered consumer has chosen item 1, 705, (View the List of Products and Services) of FIG. 18, and chosen an industry, e.g. telecommunication, the networked entity is shown a list of business entities that have provided details of products and services. When a particular business entity is chosen off the list, the networked entity is shown a Web page 545 as illustrated in FIG. 15 (including some sample data for illustrative purposes only). The Web page 545 provides in general the product/service identifier (ID) 550, here 7654321JKL; industry 555, here telecommunications; the name and contact information of the provider 560, here XYZ Telecommunication Company (no sample contact particulars); the name of the product or service 565, here mobile phone Model Z; the price of the product/service, here $100; the detailed description of the product/service (no sample data provided); and the market value of the product/service 580 (if provided by the provider) here $120. Additional information may be obtained by selecting the "More Information" 585 option which may be hyperlinked to the business entity's own Web page which describe the product/service in greater detail. If the registered consumer wishes to purchase the product/service, the "Add to Shopping Cart" 590 option is chosen. When the "Add to Shopping Cart" 590 option is chosen, the product/service ID 550 is temporarily stored in a temporary storage area of the databases 16, until the purchase is confirmed by the consumer.

Once the selections of products/services and/or group benefits plans have been made by the networked consumers, the business entity needs to deliver the chosen products or perform the chosen services, and also to invoice the transactions, if necessary. To view the list of products and/or services chosen by the networked consumers, the business entity chooses item 5, 625, from the Web page 600 of FIG. 16. This option shows a list of the registered consumers that have selected a product/service for purchase. The list can alternatively be viewed by the products/services chosen rather than by consumers. For each of the items on the list, the details of the transaction are provided which can include, the date, purchased price, product/service identifier, networked consumer identifier, associated networked entity identifier, number of units purchased, etc. The information can be linked to an invoicing system such that the purchased items may be invoiced to the consumer making the purchase. Alternatively, the invoice may be sent to the associated networked entity if the payment is to be made through a special account the networked consumer has with the networked entity.

To view the selections made on the group benefits plans, the business entity selects item 6, 630, from the Web page 600 of FIG. 16. This selection shows the following choices:

1. View the List of Negotiated Group Benefits Plans
2. View the List of Endorsed Group Benefits Plans
3. View the List of Selected Group Benefits Plans Choosing item 1 above shows a list of the group benefits plans which have been negotiated with the various networked entities, and which have been configured by the business entity. The business entity will have access to all of the group benefits plans belonging to the various networked entities which the business entity took a part in. When one of the negotiated group benefits plans is selected, the business entity is shown the Web page 900 of FIG. 12.

Choosing item 2 above shows a list of the group benefits plans which have been endorsed by the various networked entities. When one of them is selected, the business entity is shown the Web page 490 of FIG. 14.

Choosing item 3 above shows a list of the registered consumers that have selected a group benefits plan. The list can alternatively viewed by the group benefits plans chosen. For each of the items on the list, a details of the transaction are provided which can include, the date, purchased price, group benefits plan identifier, networked consumer identifier, associated networked entity identifier, etc. The information can be linked to an invoicing system such that the plans may be invoiced to the associated networked entity.

A number of payment schemes is possible. In the preferred embodiment, the payment of the group benefits plan is made by the networked entities and it follows the customary offline invoicing procedure of the networked entity 17. In one embodiment, the networked entity 17 is billed on a monthly basis. The payment is based on the number and type of group benefits plans signed on by the networked consumers, the details of which are provided along with the invoice. The details of the transactions can also be made available on the administrator's Web pages 18 and which can be accessed by the networked entity 17 having the proper login ID and password. Alternatively, the payment may be made on-line using any of the available on-line payment systems such as a secure credit card payment system which are well known those skilled in the art.

For the purchases of products/services made by the networked consumers 25, the payment can be made either directly by the consumer 25 or via the networked entity's account. Where the payment is made directly by the consumer 25, it may be made using any of the available on-line payment systems such as a secure credit card payment system. Alternatively, the consumer 25 may be billed offline. Where the payment is made through the networked entity's account, the payment is made using one of the payment schemes described above for the networked entity, and the amount is charged to the networked consumer's account with the networked entity, if any exists, or deducted from the networked consumer's salary if the networked consumer is an employee of the networked entity. Furthermore, if the group benefits plan is only partially subsidized by the network entity, the payment may also be made either directly by the consumer or via the consumer's account with the networked entity where the consumer is credited with the subsidy. Alternatively, the networked entity may make the payment, and the networked consumer is responsible for paying the difference between the price and the subsidy, or this amount is charged to the consumer's account with networked entity.

The present invention may be embodied in other specific forms without departing from the spirit or essential characteristics thereof. For instance, although here it was described that an e-mail address and a password were used as an identifier for uniquely identifying a business entity, networked entity, and a networked (or registered) consumer, it should be understood, that other forms of identifier or identifiers may be used so long as they perform the same function as that which is shown and described herein. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

We claim:

1. A trusted market place system for linking one or more group benefits providers with a plurality of networked consumers to facilitate purchase and/or enrollment decisions by said networked consumers regarding group benefit plans offered by said one or more group benefits providers, the system comprising:

one or more business entity networks, each such business entity network being associated with a different one of said one or more group benefits providers, and each such business entity network having a business entity server;

a central administrator server in secure electronic communication with each said business entity server, said central administrator server in communication with one or more electronic databases and enabling the serving of web pages reflecting content of said databases;

a plurality of networked entity networks, each said networked entity network being associated with a different employer each employing a plurality of employees, and each such networked entity networks having a networked entity server being in secure electronic communication with said central administrator server;

a plurality of networked consumer interfaces associated with each said networked entity network, said networked consumer interfaces enabling said employees employed by each said employer to communicate electronically and securely with said central administrator server via an associated one of said networked entity networks;

wherein each said business entity network and each said networked entity network has an authenticating system for performing an authentication process in communication with a security engine of said central administrator server, said authentication process enabling secure electronic communications with said central administrator server and including said authentication systems communicating a unique identifier to said administrator server, wherein said unique identifiers identify and authenticate each said group benefits provider and employer participating in said trusted market place system;

wherein said web pages provide a group benefits plan configurator for enabling said group benefits providers to utilize their respective business entity networks to provide and update information in said databases describing group benefits plans products and/or services that are offered to employees of said employers;

wherein said web pages provide a endorsement mechanism for enabling said employers to utilize their respective networked entity networks to review said information and endorse certain products and/or services for their respective employees;

wherein said web pages provide a mechanism for enabling said employees to utilize networked consumer interfaces to access said administrator server securely via their employer's respective networked entity network to review said endorsed products and/or services and make purchase and/or enrollment decisions regarding said endorsed products.

2. The system as recited in claim 1 wherein said security engine is adapted to execute code to support:

a business entity registration mechanism wherein the group benefits provider can be authenticated and a unique identifier is assigned to the group benefits provider (BEID), whereby the group benefits provider is designated a registered group benefits provider;

a networked entity registration mechanism wherein the networked entity can be authenticated, whereby the networked entity is designated a registered networked entity; and a networked consumer registration mechanism whereby each of said networked consumers having authorized access to a registered networked entity's computer system can be designated a registered consumer and assigned a unique registered consumer identifier (RCID), such that said registered consumer can access said information provided by a registered group benefits provider associated with said RCID and make personal selections on the data, the selections being stored in the databases of the administrator server.

3. The system as recited in claim 2 further comprising an on-line payment mechanism where a registered consumer can make payments to a group benefits provider for goods and/or services selected by the registered consumer.

4. The system as recited in claim 3 wherein the identifiers comprise an e-mail address and a password.

5. The system as recited in claim 4 wherein the group benefits provider may register their respective business entity network according to a registration mechanism that comprises:
   receiving registration information from the group benefits provider including an e-mail address of a contact person for the group benefits provider;
   authenticating the group benefits provider;
   assigning a password to the group benefits provider; and
   electronically sending the password to the received e-mail address.

6. The system as recited in claim 4 wherein the employers may register as a networked entity according to a registration mechanism that comprises:
   receiving registration information from the networked entity including an e-mail address of a contact person for the networked entity;
   authenticating the networked entity;
   assigning a password for the networked entity; and
   electronically sending the password to the received e-mail address.

7. The system as recited in claim 4 wherein said employees may register as a networked consumer according to a registration mechanism that comprises:
   receiving registration information from the networked consumer including an e-mail address of the networked consumer;
   authenticating the registered networked entity;
   assigning a password to the networked consumer; and
   electronically sending the password to the received e-mail address.

8. The system as recited in claim 2 further comprising a mechanism for authenticating the registered networked entity prior to designating the networked consumer as a registered consumer.

9. The system as recited in claim 1 wherein the group benefits provider is associated with an identifier in said databases that comprises is an e-mail address of a contact person for the group benefits provider and a password.

10. The system as recited in claim 1 wherein the employees have authorized access to an intra-network system of their employer, said intra-network system comprising one of the networked entity networks.

11. The system as recited in claim 10 wherein the group benefits provider is associated in said databases with an identifier that is an e-mail address of a contact person for the group benefits provider and a password.

12. The system as recited in claim 1 wherein said networked consumer interfaces comprises computers connected to said networked entity network via an intra-network system.

13. The system as recited in claim 12 wherein the intra-network system is a local area network system.

14. The system as recited in claim 12 wherein the intra-network system is a wide area network system.

15. The system as recited in claim 1 wherein said administrator server is connected to said business entity networks and said networked entity networks via an Internet system.

16. The system as recited in claim 1 wherein said authenticating systems employ the digital certificate authenticating protocol.

17. The system as recited in claim 1 wherein the servers communicate via a secure socket layer protocol.

18. The system as recited in claim 1 wherein an authorized access requires submission of a proper login ID and password.

19. A trusted market place process for linking one or more group benefits providers with a plurality of networked consumers to facilitate purchase and/or enrollment decisions by said networked consumers regarding group benefit plans offered by said one or more group benefits providers, the process comprising:
   establishing a trusted market place system comprising one or more business entity networks linked with a plurality of networked entity networks via a central administrator server, said central administrator server being in communication with one or more electronic databases and adapted to serve web pages reflecting content of said databases, each said business entity network having a business entity server and an authentication system, and each such networked entity network having a networked entity server and an authentication system and communicating with a secure network providing a plurality of networked consumer interfaces, said business entity servers and said networked entity servers being in secure electronic communication with said central administrator server, each said business entity network being associated with a different one of said one or more group benefits providers, and each said networked entity network being associated with a different employer each employing a plurality of employees;
   authenticating each said business entity network and each said networked entity network to said central administrator server, said authenticating comprising said business entity server and said networked entity servers communicating with a security engine of said central administrator server, and said central administrator server assigning a unique identifier for each said business entity network and each said networked entity network,
   communicating first communications between said central administrator server and said business entity networks regarding respective group benefits providers, said first communications comprising said respective group benefits providers creating and updating information in said databases describing group benefits plans products and/or services that they offer to said employees of said employers;
   communicating second communications between said central administrator server and said networked entity networks regarding respective employers, said second communications comprising said respective employers reviewing said information and said respective employers endorsing at least one group benefits plan offered to their respective employees, said endorsed products and/or services being recorded in said databases;
   communicating third communications between said central administrator server and said networked consumer interfaces regarding respective employees, said third communications being routed via respective ones of said networked entity networks depending upon said respective employee's associated employer and comprising said respective employees reviewing products and/or services of said group benefits plans endorsed by their employer and making purchase and/or enrollment decisions regarding said endorsed products and/or services,
   wherein said unique identifiers identify and authenticate each said group benefits provider and employer participating in said trusted market place system during said first, second, and third communications such that said web pages are served during said first, second, and third communications in a secure manner.

20. The trusted market place process as recited in claim 19 wherein said administrator server is adapted to execute:

a business entity registration process wherein said group benefits providers can be authenticated and a unique identifier (BEID) assigned whereby the group benefits provider is designated a registered group benefits provider;

a networked entity registration process wherein said employers can be authenticated whereby the networked entity networks of each employer is designated a registered networked entity; and a networked consumer registration process whereby each of said employees having authorized access to a registered networked entity's computer system can be designated a registered consumer and assigned a unique registered consumer identifier (RCID), such that said registered consumer can access said information provided by a registered group benefits provider associated with said RCID and make personal selections on the data, the selections being stored in the databases of the administrator server.

21. The trusted market place process as recited in claim 20 wherein each said registered consumer has authorized access to an associated registered networked entity's computer system through that registered networked entity's intra-network system.

22. The trusted market place process as recited in claim 20 wherein each said registered consumer has authorized access to an associated registered networked entity's computer system through an Internet system.

23. The trusted market place process as recited in claim 20 further comprising the act of providing an on-line payment system where a registered networked entity can make payments to a group benefits provider for group benefits plans selected by a registered consumer.

24. The trusted market place process as recited in claim 20 wherein the identifiers comprise an e-mail address and a password.

25. The trusted market place process as recited in claim 24 wherein a process for designating a group benefits provider as a registered group benefits provider comprises the acts of:

receiving registration information from the group benefits provider including an e-mail address of a contact person for the group benefits provider;

authenticating the group benefits provider;

assigning a password to the group benefits provider; and electronically sending the password to the received e-mail address.

26. The trusted market place process as recited in claim 24 wherein a process for designating an employer as a registered networked entity comprises the acts of:

receiving registration information from the employer including an e-mail address of a contact person for the employer;

authenticating the networked entity network of the employer;

assigning a password to the contact person of the employer; and electronically sending the password to the received e-mail address.

27. The trusted market place process as recited in claim 24 wherein a process for designating an employee as a registered consumer comprises the acts of:

receiving registration information from the employee including an e-mail address of the employee;

authenticating the registered networked entity associated with the employee;

assigning a password to the employee; and electronically sending the password to the received e-mail address.

28. The trusted market place process as recited in claim 20 further comprising the act of authenticating the registered networked entity prior to designating the networked consumer as a registered consumer.

29. The trusted market place process as recited in claim 19 wherein the communications employ a secure socket layer protocol.

30. The trusted market place process as recited in claim 19 wherein the authentication is accomplished by exchanging digital certificates.

* * * * *

UNITED STATES PATENT AND TRADEMARK OFFICE
CERTIFICATE OF CORRECTION

| | |
|---|---|
| PATENT NO. | : 7,418,429 B1 |
| APPLICATION NO. | : 09/693437 |
| DATED | : August 26, 2008 |
| INVENTOR(S) | : Kerry Mok et al. |

It is certified that error appears in the above-identified patent and that said Letters Patent is hereby corrected as shown below:

In claim 1, column 20, line 28, "a endorsement" should read --an endorsement--.

In claim 9, column 21, line 38, "comprises is an" should read --comprises an--.

In claim 12, column 21, line 49, "comprises" should read --comprise--.

Signed and Sealed this

Twenty-fifth Day of November, 2008

JON W. DUDAS
*Director of the United States Patent and Trademark Office*